(12) United States Patent
Kobayashi et al.

(10) Patent No.: US 12,047,288 B2
(45) Date of Patent: Jul. 23, 2024

(54) SWITCHING DEVICE, METHOD AND STORAGE MEDIUM

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yuta Kobayashi, Ota (JP); Takahiro Yamaura, Kawasaki (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 339 days.

(21) Appl. No.: 17/652,767

(22) Filed: Feb. 28, 2022

(65) Prior Publication Data
US 2022/0400078 A1    Dec. 15, 2022

(30) Foreign Application Priority Data

Jun. 15, 2021    (JP) ................. 2021-099617

(51) Int. Cl.
*H04L 45/74* (2022.01)
*G06F 16/22* (2019.01)
*H04L 49/90* (2022.01)

(52) U.S. Cl.
CPC .......... *H04L 45/74* (2013.01); *G06F 16/2255* (2019.01); *H04L 49/90* (2013.01)

(58) Field of Classification Search
CPC ...... H04L 45/74; H04L 49/90; G06F 16/2255
See application file for complete search history.

(56) References Cited

U.S. PATENT DOCUMENTS

| 6,438,130 | B1 * | 8/2002 | Kagan | ................... H04L 49/351 398/48 |
| 10,412,017 | B2 | 9/2019 | Kobayashi et al. | |
| 10,778,594 | B2 | 9/2020 | Kobayashi et al. | |

(Continued)

FOREIGN PATENT DOCUMENTS

| JP | 5433627 B2 | 3/2014 |
| JP | 6833644 B2 | 2/2021 |

(Continued)

*Primary Examiner* — Hashim S Bhatti
(74) *Attorney, Agent, or Firm* — Oblon, McClelland, Maier & Neustadt, L.L.P.

(57) ABSTRACT

According to one embodiment, a receiving unit receives a frame from a first external communication device connected to a first communication port. First and second databases store destination determination information used to determine a second communication port to which a second external communication device is connected. A determination unit determines the second communication port by accessing destination determination information in the first database when the received frame is a first frame, and determines the second communication port by accessing destination determination information in the second database when the received frame is a second frame. The first database is accessible to the destination determination information at a higher speed than the second database.

14 Claims, 16 Drawing Sheets

(56) References Cited

U.S. PATENT DOCUMENTS

| | | | |
|---|---|---|---|
| 10,884,786 B2 | 1/2021 | Kobayashi et al. | |
| 2009/0097495 A1* | 4/2009 | Palacharla | H04L 49/901 370/413 |
| 2014/0016649 A1* | 1/2014 | Sinha | H04L 45/745 370/401 |
| 2014/0297907 A1* | 10/2014 | Kurosaki | H04L 49/90 710/57 |
| 2015/0089032 A1* | 3/2015 | Agarwal | H04L 41/0893 709/221 |
| 2016/0105377 A1* | 4/2016 | Nakagawa | H04L 49/3009 370/392 |
| 2021/0149603 A1 | 5/2021 | Kobayashi et al. | |
| 2022/0197841 A1 | 6/2022 | Yamaura et al. | |
| 2022/0237009 A1 | 7/2022 | Kobayashi et al. | |
| 2022/0294556 A1 | 9/2022 | Yamaura et al. | |

FOREIGN PATENT DOCUMENTS

| | | |
|---|---|---|
| JP | 2021-82867 A | 5/2021 |
| JP | 6889126 B2 | 6/2021 |
| JP | 6914900 B2 | 8/2021 |
| JP | 2022-96476 A | 6/2022 |
| JP | 2022-112621 A | 8/2022 |
| JP | 2022-139706 A | 9/2022 |

* cited by examiner

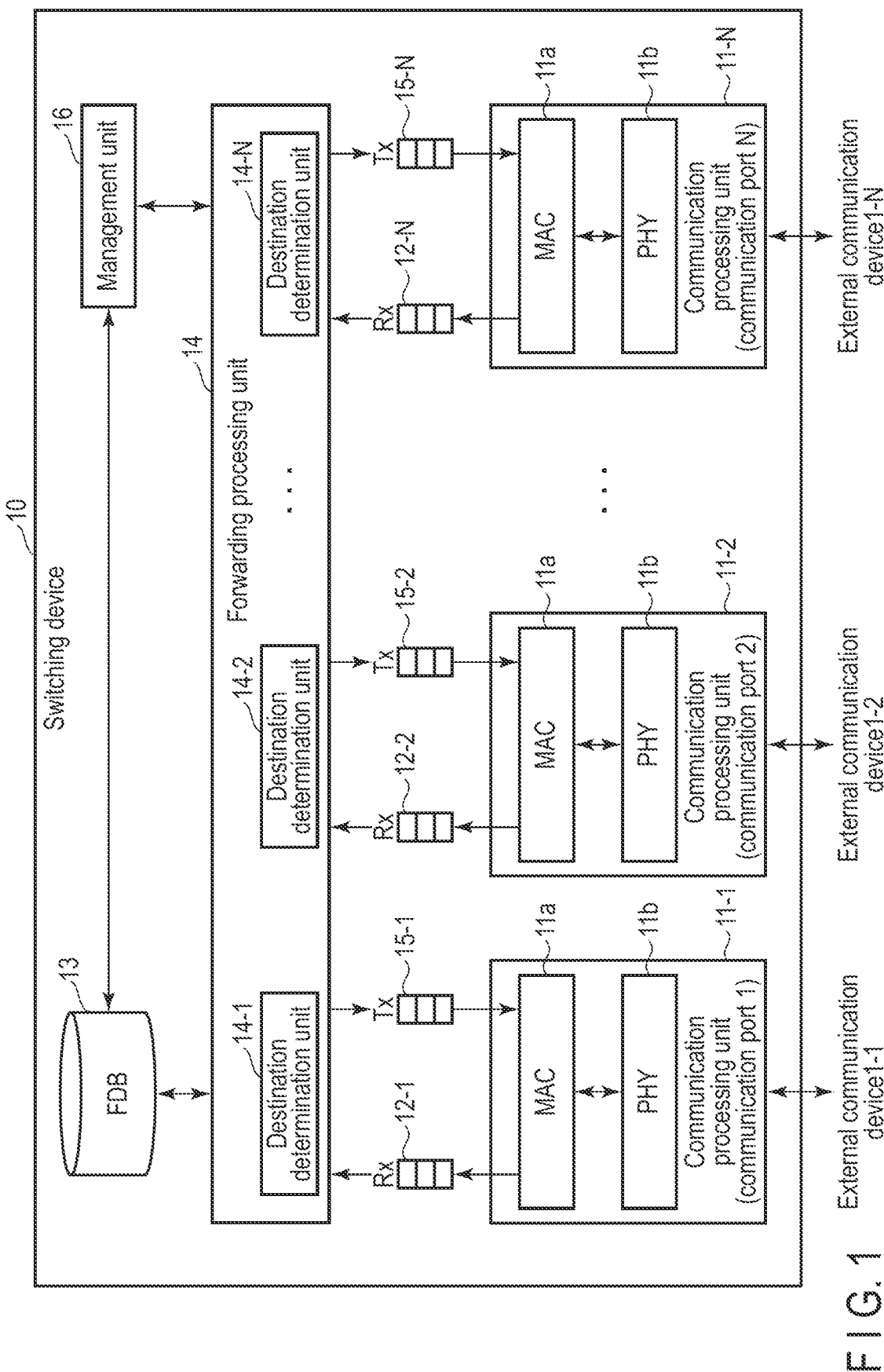
F I G. 1

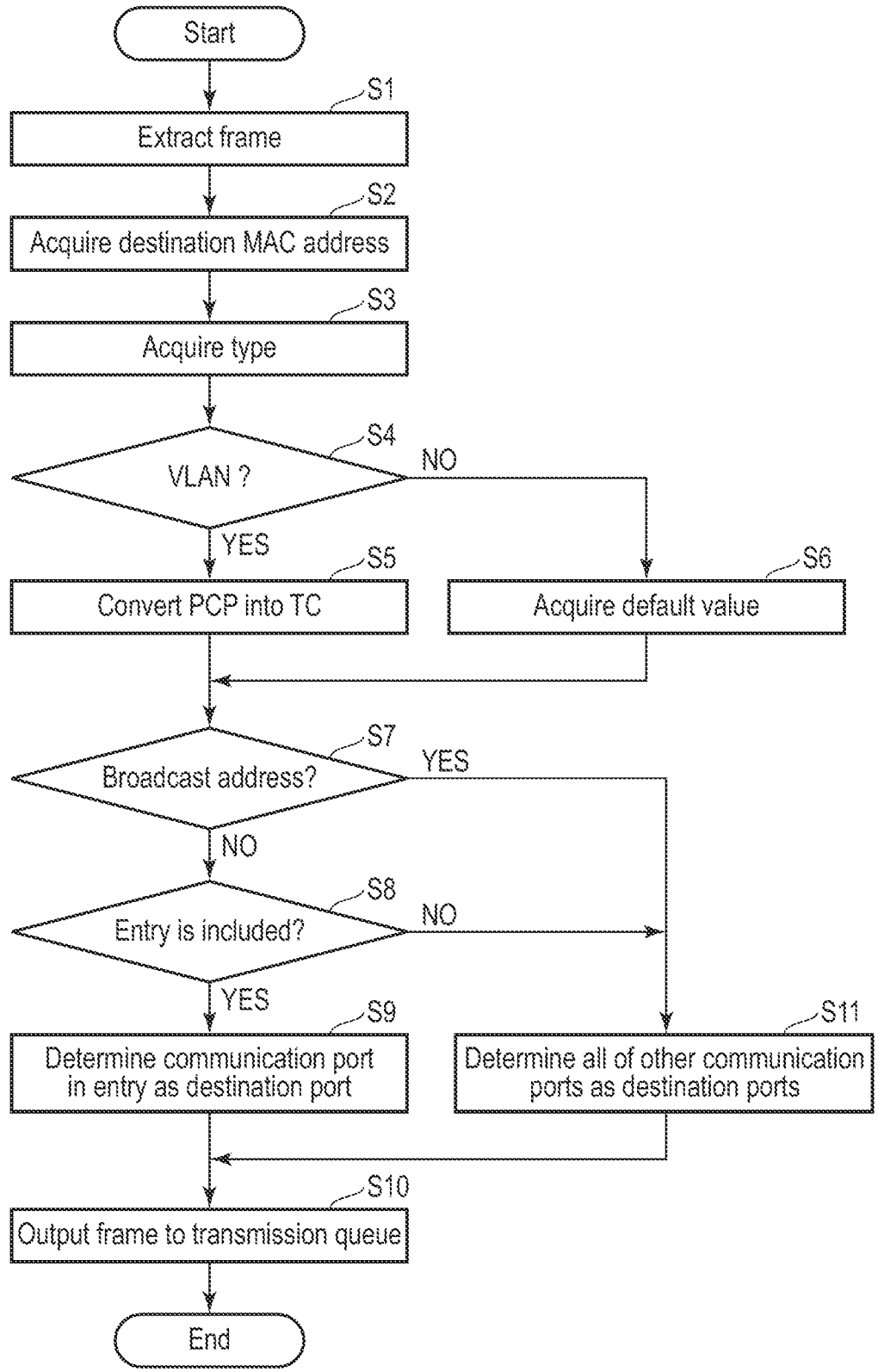
F I G. 3

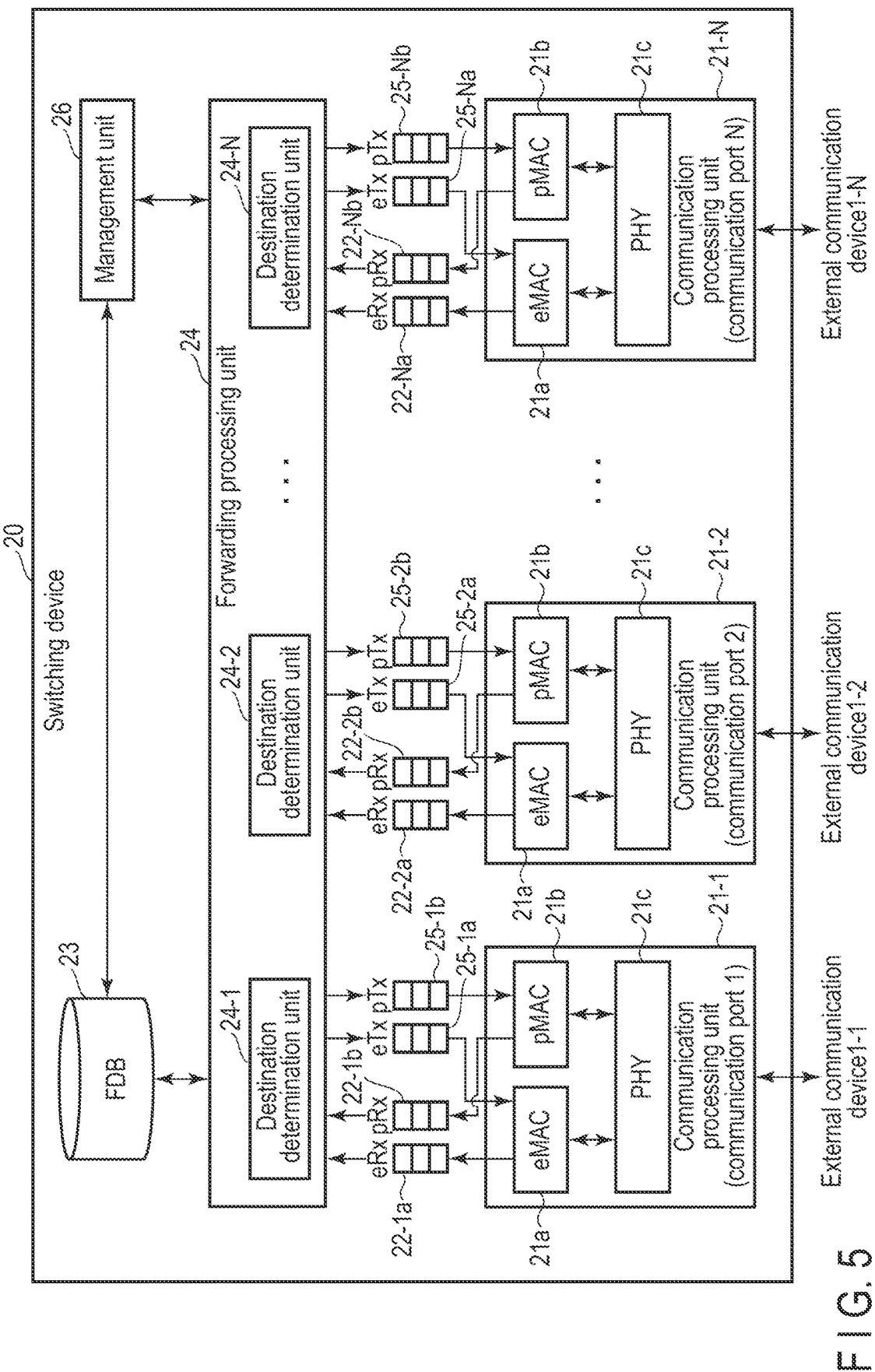
F I G. 5

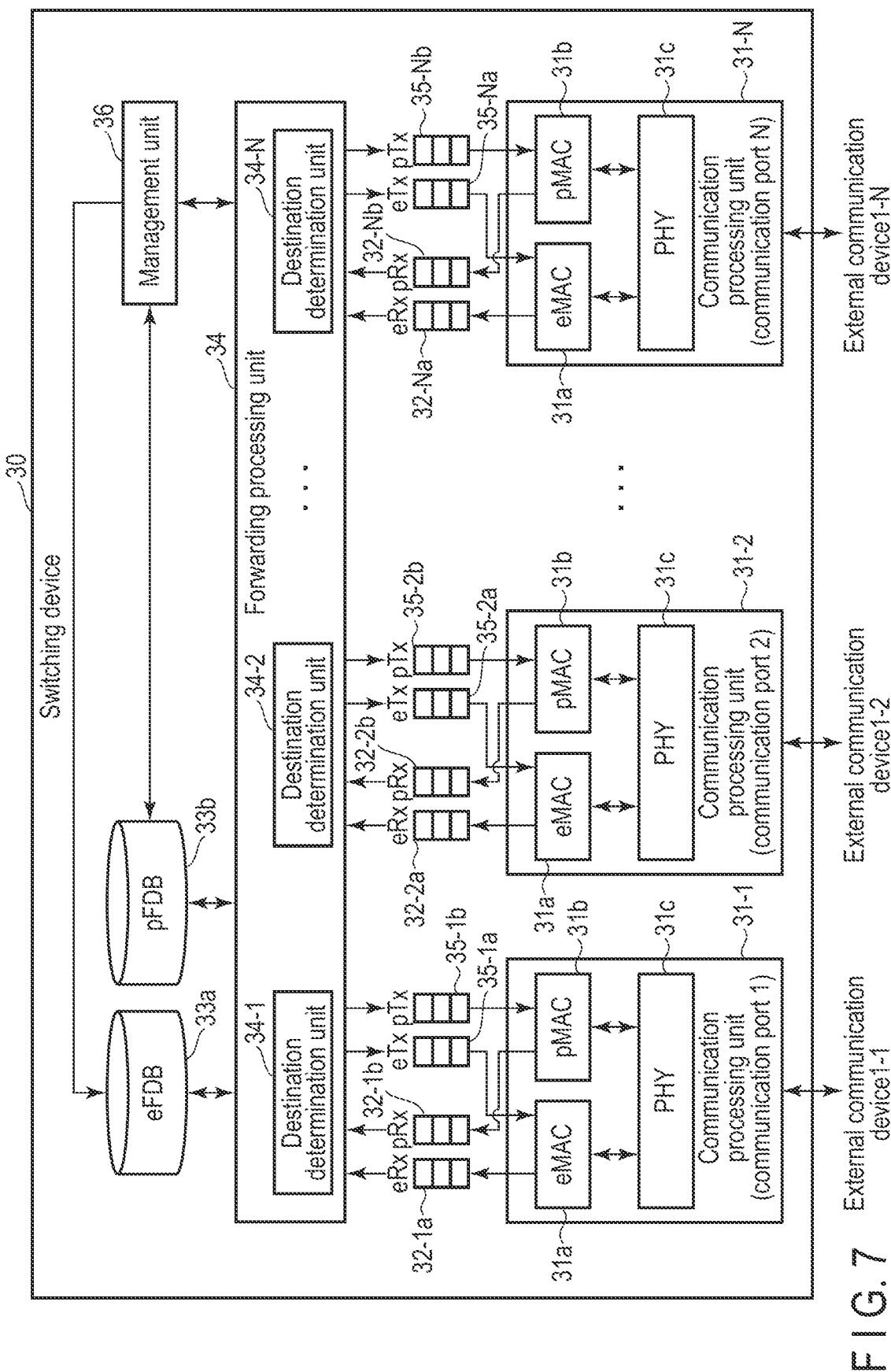
F I G. 7

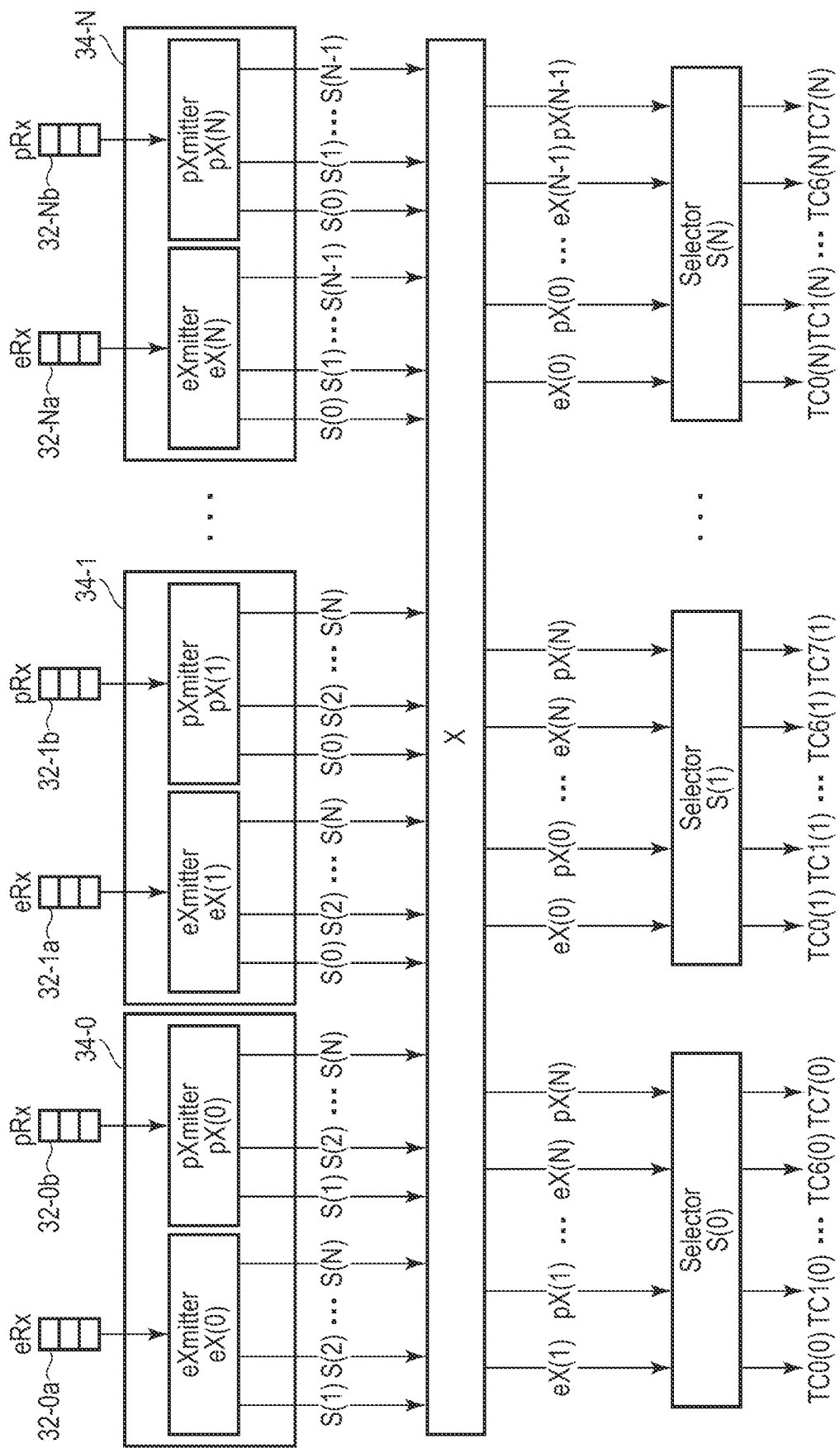
F I G. 10

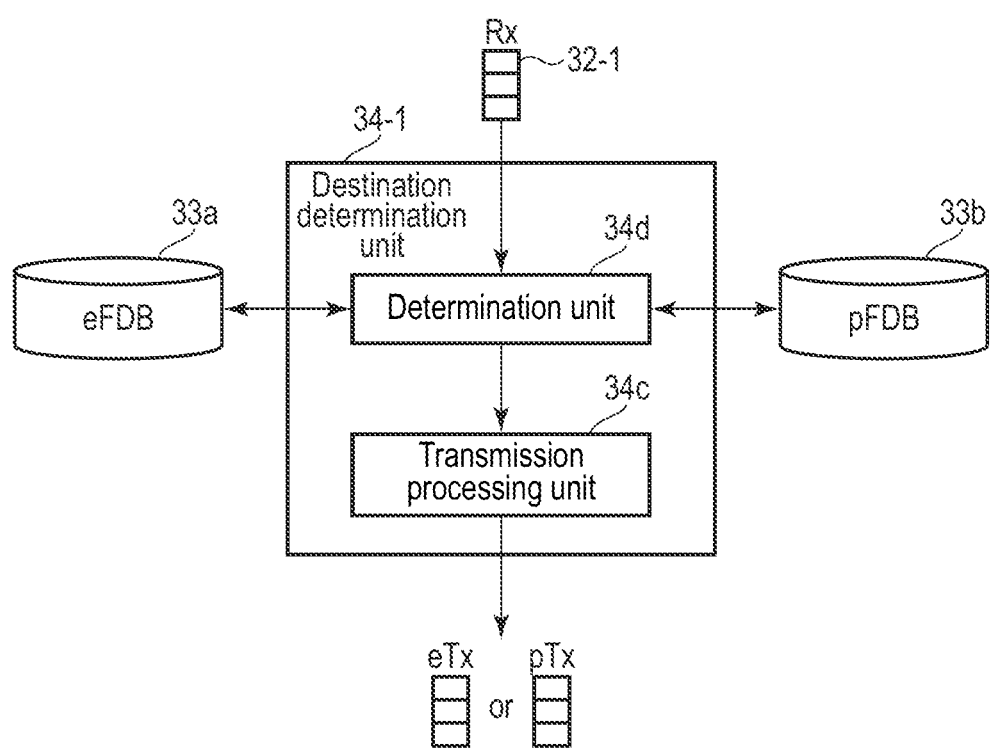
F I G. 12

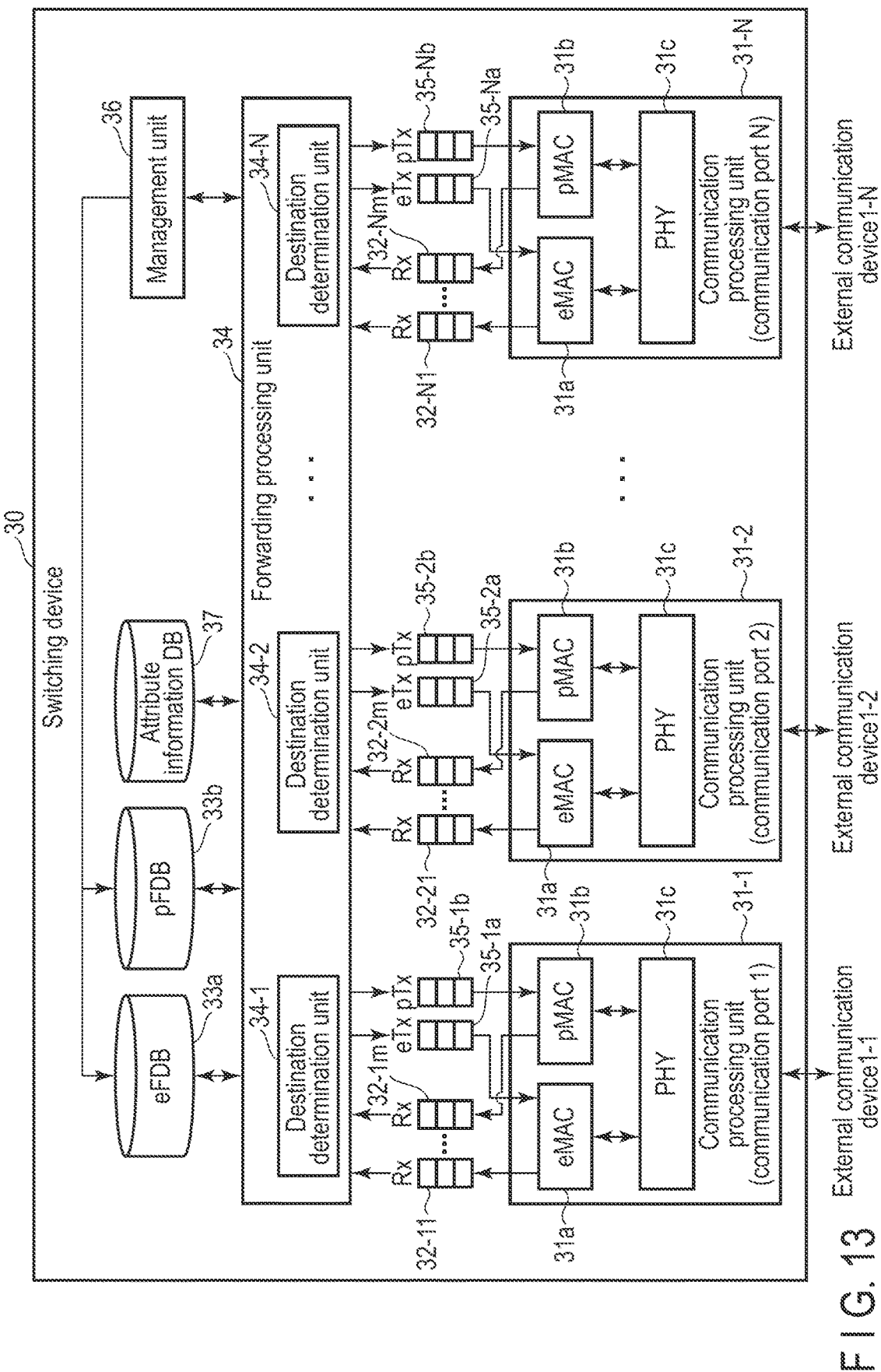
F I G. 13

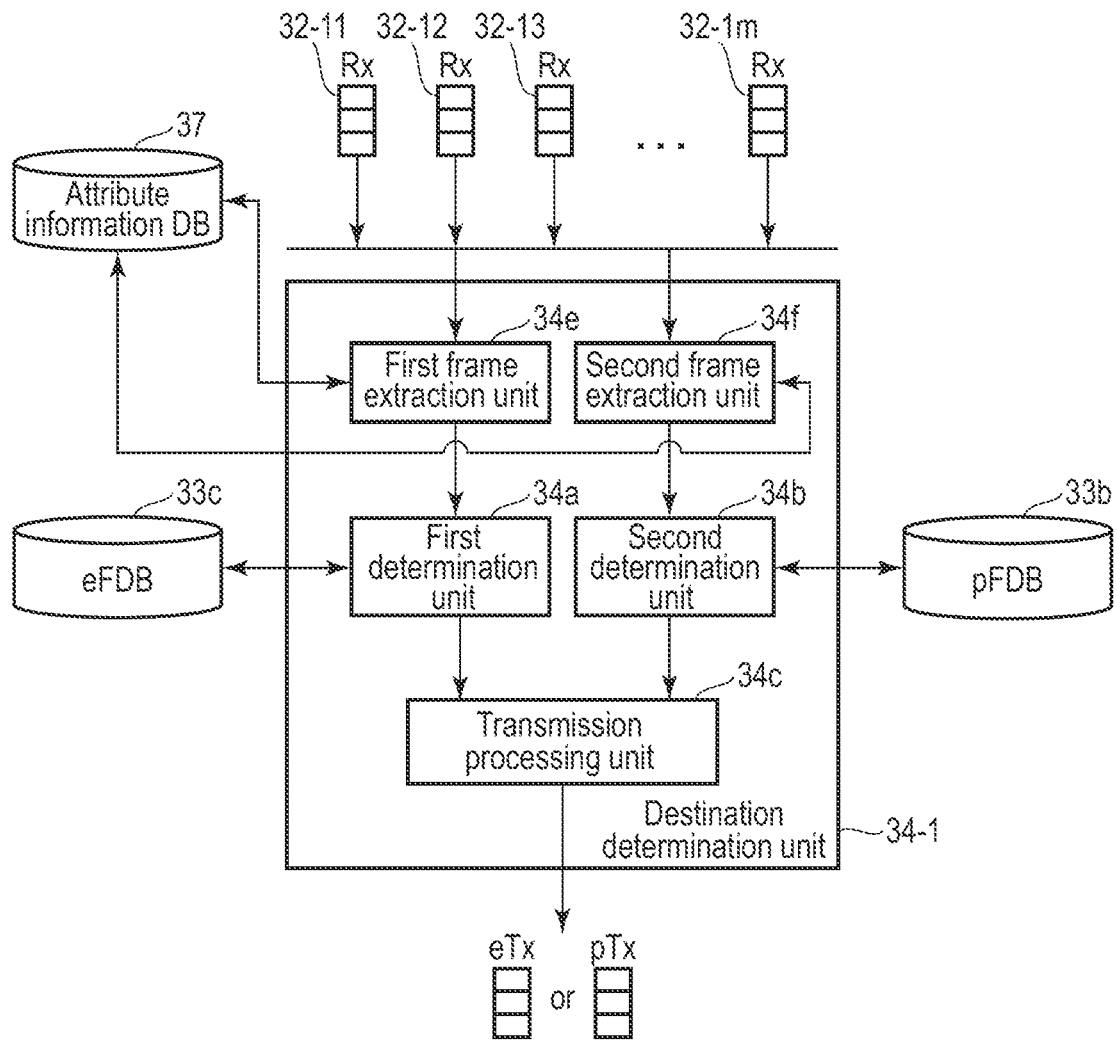
F I G. 14

| Rx1 | Real-time frame |
|-----|-----------------|
| Rx2 | Best-effort frame |
| ⋮ | ⋮ |
| Rxm | Best-effort frame |
F I G. 15
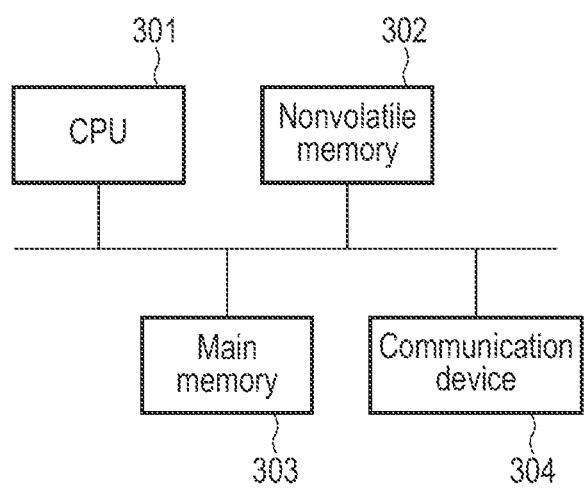
F I G. 16

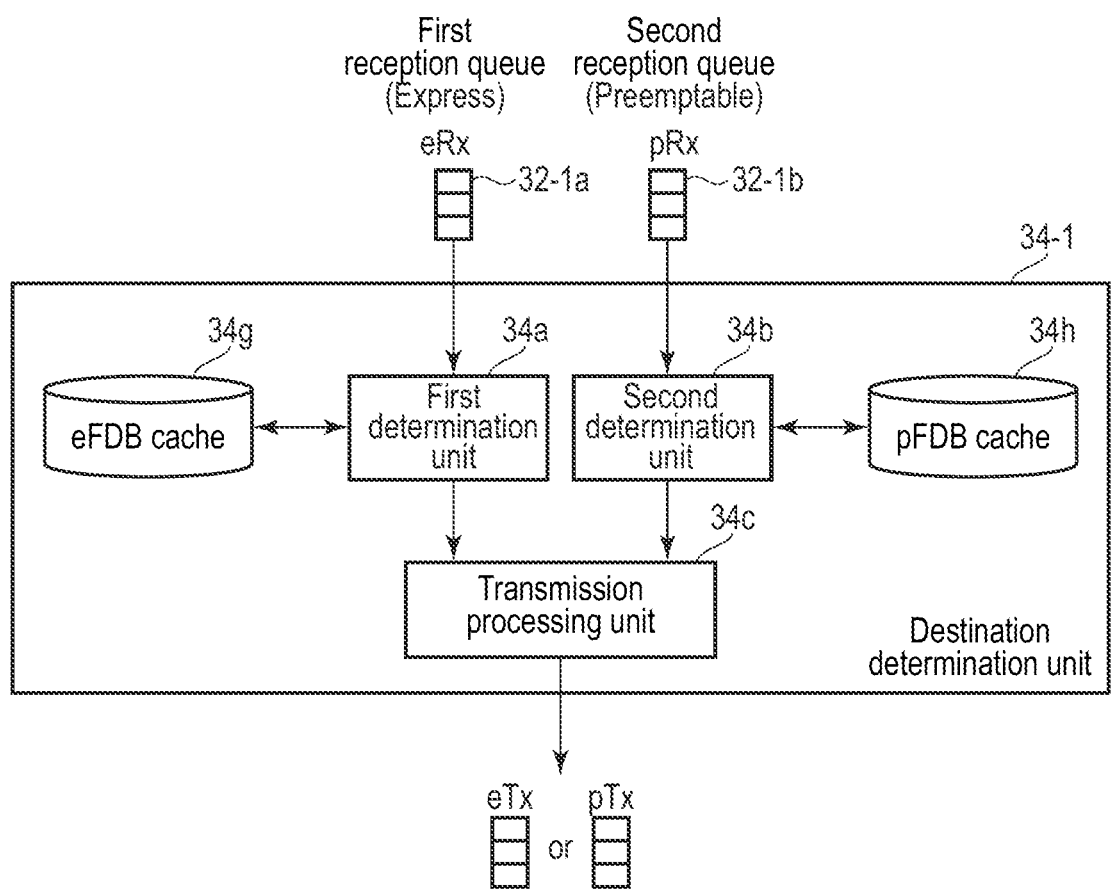
F I G. 17

SWITCHING DEVICE, METHOD AND STORAGE MEDIUM

CROSS-REFERENCE TO RELATED APPLICATIONS

This application is based upon and claims the benefit of priority from Japanese Patent Application No. 2021-099617, filed Jun. 15, 2021, the entire contents of which are incorporated herein by reference.

FIELD

Embodiments described herein relate generally to a switching device, a method and a storage medium.

BACKGROUND

Ethernet (registered trademark) is being increasingly used, for example, in the field of an industrial network for connecting devices located in a factory, an in-vehicle network for connecting controllers of an in-vehicle system mounted on a vehicle such as an automobile, and the like.

The industrial network and in-vehicle network may require real-time performance. To achieve the real-time performance, various network technologies (standards) in which Ethernet is extended have been proposed.

The network based on Ethernet is built using a switching device (communication control device) called an L2 switch. The switching device includes a plurality of communication ports (network ports) to perform an operation of forwarding a frame (data) transmitted from an external communication device connected to a predetermined communication port to another external communication device connected to another communication port.

In order to achieve real-time performance in a network built using the above switching device, it is important to decrease delay time (forward delay) and its jitter when the switching device forwards a frame.

On the other hand, the switching device refers to a database called forwarding/filtering database (FDB) to determine a communication port to which an external communication device, which serves as a destination to which a frame is forwarded, is connected. In consideration of the number of devices connected to the switching device, the capacity of the database (the number of entries that can be held) should be large.

However, when a database accessible at high speed and with low delay is implemented to decrease the delay time, it is difficult to increase the capacity of the database. In other words, it is difficult to achieve a switching device capable of both decreasing delay time and increasing the capacity of a database.

BRIEF DESCRIPTION OF THE DRAWINGS

FIG. 1 is a block diagram illustrating an example of a configuration of a switching device according to a first comparative example of a first embodiment.

FIG. 3 is a flowchart showing an example of a processing procedure of the destination determination unit.

FIG. 5 is a block diagram illustrating an example of a configuration of a switching device according to a second comparative example of the first embodiment.

FIG. 7 is a block diagram illustrating an example of a configuration of a switching device according to the first embodiment.

FIG. 10 is a block diagram illustrating an operation of the forwarding processing unit.

FIG. 12 is a block diagram illustrating an example of a configuration of a destination determination unit included in a forwarding processing unit.

FIG. 13 is a block diagram illustrating an example of a configuration of a switching device according to a second modification to the first embodiment.

FIG. 14 is a block diagram illustrating an example of a configuration of a destination determination unit included in a forwarding processing unit.

FIG. 15 is a table showing an example of a data structure of attribute information.

FIG. 16 is a block diagram showing an example of a hardware configuration of a switching device.

FIG. 17 is block diagram illustrating an example of a configuration of a destination determination unit included in a forwarding processing unit in a second embodiment.

DETAILED DESCRIPTION

Figure 2:
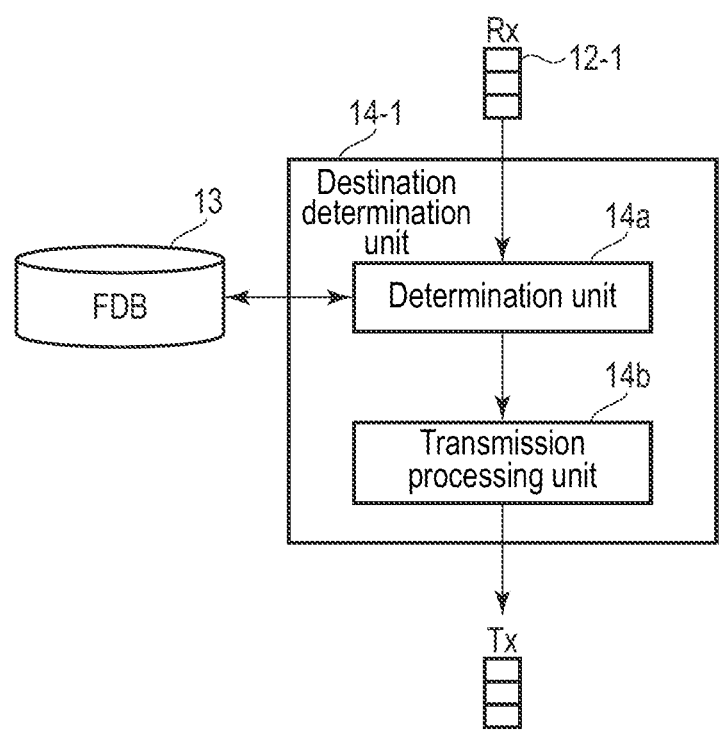
FIG. 2 is a block diagram illustrating an example of a configuration of a destination determination unit included in a forwarding processing unit.

In general, according to one embodiment, a switching device including a plurality of communication ports includes a receiving unit, a first database and second database, and a determination unit. The receiving unit is configured to receive a frame from a first external communication device connected to a first communication port of the communication ports. The first database and a second database are configured to store destination determination information used to determine a second communication port of the communication ports to which a second external communication device serving as a destination of the received frame, is connected. The determination unit is configured to determine the second communication port by accessing destination determination information stored in the first database based on header information added to a first frame which is to be forwarded with low delay when the received frame is the first frame, and determine the second communication port by accessing destination determination information stored in the second database based on header information added to a second frame which differs from the first frame when the received frame is the second frame. The first database is accessible to the destination determination information at a higher speed than the second database.

Various embodiments will be described with reference to the accompanying drawings.

First Embodiment

A first embodiment will be described first. The switching device according to the first embodiment is, for example, a switching device (communication control device) such as an L2 switch for use in building an Ethernet-based network (simply referred to as network hereinafter). The switching device includes a plurality of communication ports (network ports) to operate to forward a frame, which is transmitted from an external communication device connected to a predetermined communication port, to another external communication device connected to another communication port.

An example of a configuration of a switching device according to a first comparative example of the first embodiment will be described below with reference to FIG. 1.

The switching device 10 shown in FIG. 1 includes, for example, N communication ports 1 to N, N communication processing units (communication interfaces) 11-1 to 11-N, N reception queues (Rx) 12-1 to 12-N, a forwarding/filtering database (FDB) 13, a forwarding processing unit 14, N transmission queues (Tx) 15-1 to 15-N, and a management unit 16. Assume here that N external communication devices 1-1 to 1-N are connected to their respective N communication ports.

The N communication processing units 11-1 to 11-N correspond to the N communication ports 1 to N, and are configured to perform communications with the external communication devices 1-1 to 1-N.

Each of the communication processing units 11-1 to 11-N has a function that is referred to as a media access controller (MAC) 11a and a PHY 11b to perform a process necessary for transmission and reception of a frame according to the protocol of a physical layer and a data link layer in a network. That is, each of the communication processing units 11-1 to 11-N performs a process of a physical layer and a data link layer of the Ethernet.

The communication processing units 11-1 to 11-N receive frames from the external communication devices 1-1 to 1-N connected to the communication ports 1 to N. The frames received by the communication processing units 11-1 to 11-N are output to the reception queues 12-1 to 12-N.

In the example shown in FIG. 1, it is assumed that the communication processing units 11-1 to 11-N include the MAC 11a and the PHY 11b, but the communication processing units 11-1 to 11-N may be configured to have another function (to perform another process).

The N reception queues 12-1 to 12-N correspond to the N communication processing units 11-1 to 11-N (communication ports 1 to N). The reception queues 12-1 to 12-N are queues for use in transferring frames from the communication processing units 11-1 to 11-N to the forwarding processing unit 14. As described above, the frames output from the communication processing units 11-1 to 11-N are stored in the reception queues 12-1 to 12-N.

Since the frames transmitted from the external communication devices 1-1 to 1-N need to be forwarded to another external communication device as described above, the switching device 10 needs to determine a communication port to which an external communication device, which serves as a destination to which the frames is forwarded (referred to as destination port hereinafter), is connected.

The FDB 13 stores information for determining a destination port (destination of the frame) for the frames stored in the reception queues 12-1 to 12-N (referred to as destination determination information hereinafter).

The forwarding processing unit 14 includes N destination determination units 14-1 to 14-N corresponding to the N reception queues 12-1 to 12-N.

The destination determination units 14-1 to 14-N extracts the frames from the reception queues 12-1 to 12-N and refers to the FDB 13 (the destination determination information stored in the FDB) to determine a destination port for the frames.

When a destination port for the frames is determined, the frames are output to a transmission queue corresponding to the destination port.

The N transmission queues 15-1 to 15-N correspond to the N communication processing units 11-1 to 11-N (communication ports 1 to N). The transmission queues 15-1 to 15-N are queues for use in transferring frames from the forwarding processing unit 14 (destination determination units 14-1 to 14-N) to the communication processing units 11-1 to 11-N. As described above, the frame output from each of the destination determination units 14-1 to 14-N included in the forwarding processing unit 14 to a transmission queue corresponding to the destination port is stored in the transmission queue.

As described above, the frames stored in the transmission queues 15-1 to 15-N are extracted by the communication processing units 11-1 to 11-N and transmitted to the external communication devices 1-1 to 1-N.

The management unit 16 performs a process for initializing, starting and stopping the switching device 10, updating the FDB 13 (adding and deleting entries), managing statistical information, and the like.

In FIG. 1, it is assumed that the reception queues 12-1 to 12-N and the transmission queues 15-1 to 15-N are provided outside the communication processing units 11-1 to 11-N. However, the reception queues 12-1 to 12-N and transmission queues 15-1 to 15-N may be held, for example, at the interior of the communication processing units 11-1 to 11-N (e.g., MAC 11a). Alternatively, the reception queues 12-1 to 12-N and transmission queues 15-1 to 15-N may be held at the interior of the forwarding processing unit 14.

An example of the configuration of the destination determination unit 14-1 included in the forwarding processing unit 14 shown in FIG. 1 will be described below with reference to FIG. 2. As shown in FIG. 2, the destination determination unit 14-1 includes a determination unit 14a and a transmission processing unit 14b.

The determination unit 14a extracts a frame from the reception queue 12-1 corresponding to the destination determination unit 14-1, parses header information added to the frame, and accesses the FDB 13 (destination determination information stored in the FDB 13) based on the header information. Based on the destination determination information thus accessed, the determination unit 14a determines a destination port for the frame extracted from the reception queue 12-1.

The header information added to the frame includes a MAC address (destination MAC address) assigned to the external communication device serving as a destination to which the frame is forwarded (forward destination), a MAC address (transmission source MAC address) assigned to the external communication device serving as a source to which the frame is transmitted, the type of Ethernet, and the like.

The transmission processing unit 14b outputs the frame extracted from the reception queue 12-1 to a transmission queue (destination transmission queue) corresponding to a destination port determined by the determination unit 14a.

An example of a processing procedure of the destination determination unit 14-1 will be described below with reference to the flowchart of FIG. 3.

First, when a frame is stored in the reception queue 14-1 corresponding to the destination determination unit 14-1, the determination unit 14a extracts the frame from the reception queue 12-1 (step S1). Hereinafter, the frame extracted in step S1 will be referred to as a target frame for convenience.

Then, the determination unit 14*a* acquires a destination MAC address included in the header information added to the target frame (step S2).

The determination unit 14*a* also acquires a type of Ethernet included in the header information added to the target frame (step S3).

On the network configured using the switching device 10, a virtual LAN segment called a virtual LAN (VLAN) to which at least some of the communication ports 1 to N belongs can be constructed. The frames can be transmitted (broadcast-transmitted) to, for example, all external communication devices existing on the network. According to this VLAN, a broadcast domain can be divided. When a frame is broadcast-transmitted, header information added to the frame includes a MAC address for broadcast transmission (referred to as broadcast address hereinafter) as a destination MAC address.

If a VLAN to which the communication port 1 corresponding to the communication processing unit 11-1 that has received the target frame belongs is constructed, the type of Ethernet acquired in step S3 is a VLAN.

The determination unit 14*a* determines whether the type of Ethernet acquired in step S3 is a VLAN (step S4).

Assume that in step S4 the determination unit 14*a* determines that the type of Ethernet is a VLAN (YES in step S4). When the type of Ethernet is a VLAN, the header information added to the target frame includes a VLAN header (information), and a priority code point (PCP) is set in the VLAN header. In addition to the PCP, for example, a VLAN ID for identifying the VLAN is set in the VLAN header.

The determination unit 14*a* acquires the PCP so set in the VLAN header and converts the PCP into a traffic class (TC) to acquire the TC (step S5). The TC is information for specifying a transmission queue, for example. Assume here that information for converting a PCP into a TC (information indicating a correspondence between the PCP and TC) is held in advance in the determination unit 14*a* (e.g., a traffic class table).

On the other hand, when the determination unit 14*a* determines that the type of Ethernet is not a VLAN (NO in step S4), no PCP can be acquired (that is, the PCP cannot be converted into a TC) because the header information added to the target frame does not include the VLAN header. In this case, the determination unit 14*a* acquires a TC of a default value (step S6). In other words, in step S6, a default value is set in the TC (e.g., PVID).

As described above, the target frame can be broadcast, for example. The determination unit 14*a* determines whether the destination MAC address acquired in step S2 is a broadcast address (step S7).

When the determination unit 14*a* determines that the destination MAC address is not a broadcast address (NO in step S7), it refers to the FDB 13 based on the header information added to the target frame.

The FDB 13 stores a plurality of items of destination determination information (entries) including an identifier for identifying a communication port (referred to as a port identifier hereinafter), a MAC address, a VLAN ID, the last reception time, etc., in association with each other. Note that the MAC address is a MAC address assigned to an external communication device connected to a communication port identified by the associated port identifier. If the external communication device is a switch, a MAC address connected to the switch is also included. The VLAN ID is identification information for identifying a VLAN to which a communication port identified by the associated port identifier belongs. The last reception time is, for example, time when the last frame was transmitted from the external communication device to which the associated MAC address is assigned, and then received by the switch.

In this case, the determination unit 14*a* searches the FDB 13 for an entry including a VLAN ID set in the header information (VLAN header) added to the target frame and the destination MAC address acquired in step S2 (that is, an entry in which the destination MAC address and the VLAN ID match). Hereinafter, an entry in which the destination MAC address and the VLAN ID match will be referred to as a target entry for convenience.

Based on the result of the above search, the determination unit 14*a* determines whether the FDB 13 includes a target entry (step S8).

When the determination unit 14*a* determines that the FDB 13 includes a target entry (YES in step S8), it determines the communication port, which is identified by a port identifier included in the target entry, as a destination port (that is, a communication port in the target entry) (step S9).

When the process of step S9 is executed, the transmission processing unit 14*b* outputs the target frame to a transmission queue specified based on the TC among the transmission queues corresponding to the destination port acquired in step S9 (step S10). When the process of step 10 is executed, the target frame is stored in (written to) the transmission queue corresponding to the destination port.

Specifically, when the destination port determined in step S9 is, for example, a communication port 2, the target frame is output to a transmission queue 15-2 corresponding to the communication port 2. Similarly, when the destination port determined in step S9 is a communication port N, the target frame is output to a transmission queue 15-N corresponding to the communication port N.

According to the configuration shown in FIG. 1, there is a one-to-one relationship between the communication ports (communication processing units) and the transmission queues. In this case, a transmission queue can be specified if a destination port is determined, and thus the TC described above may not be used.

On the other hand, when a plurality of transmission queues are prepared for one communication port, a transmission queue to output a target frame using a TC is specified from among the transmission queues prepared for a destination port.

In this case, the transmission processing unit 14*b* has only to hold in advance information indicating a correspondence between the TC and the transmission queue specified based on the TC (that is, information for specifying a transmission queue from the TC).

When the determination unit 14*a* determines in step S7 that the destination MAC address is a broadcast address (YES in step S7), it determines all of the communication ports other than the communication port 1 to which the external communication device 1-1 that has transmitted a target frame is connected, as destination ports (step S11).

When the determination unit 14*a* determines in step S8 that the FDB 13 includes no target entry (NO in step S8), the process of step S11 is executed. When the FDB 13 includes no target entry, frames are transmitted to all of the communication ports other than the communication port 1 to which the external communication device 1-1 that has transmitted the target frame is connected. This frame transmission is called flooding.

If the type of Ethernet included in header information added to the target frame is a VLAN (that is, if a VLAN to which the communication port 1 belongs is built), all of the communication ports in step S11 are all of the communication ports other than the communication port 1 among the communication ports belonging to the VLAN (VLAN identified by the VLAN ID set in the VLAN header).

The example shown in FIG. 3 has been described in which the destination MAC address is a broadcast address, but the destination MAC address may be a multicast address. In the process shown in FIG. 3, the determination unit 14*a* may further determine whether the destination MAC address is a multicast address. This determination may be made by determining whether the I/G bit of the destination MAC address is 1. As a method of managing destination determination information (entry) including a multicast address, the FDB 13 can be used, an FDB for multicast address can be used separately from the FDB 13, or the like. When the FDB 13 manages destination determination information (entry) including a multicast address, a plurality of port identifiers are held in the destination determination information to determine a communication port to be a destination by referring to the FDB 13 in step S8 similar to a unicast frame. When an FDB is separately provided for multicast address, if the destination MAC address is determined as a multicast address, a communication port to be a destination is determined by referring to the FDB for multicast address instead of the FDB 13.

The configuration and operation of the destination determination unit 14-1 included in the forwarding processing unit 14 have been described so far. The same holds true of the configuration and operation of the other destination determination units 14-2 to 14-N.

In the switching device 10 according to the first comparative example of the first embodiment, the forwarding processing unit 14 (the destination determination units 14-1 to 14-N included in the forwarding processing unit) performs the process shown in FIG. 3. Thus, a frame transmitted from a predetermined external communication device can be forwarded to another external communication device.

In the switching device 10 according to the first comparative example, it is assumed that the FDB 13 can be updated by learning a MAC address based on the frames transmitted from the external communication devices 1-1 to 1-N (that is, the frames received by the switching device 10).

An example of a procedure for update processing of the FDB 13 will be described below with reference to the flowchart shown in FIG. 4. The update processing is executed by, for example, the forwarding processing unit 14 (the destination determination units 14-1 to 14-N). It may be executed by the management unit 16 and may be executed by an updating unit (not shown) provided separately from the forwarding processing unit 14 and the management unit 16. Assume here that the forwarding processing unit 14 executes the update processing of the FDB 13.

First, the forwarding processing unit 14 acquires a frame (step S21). The frame acquired in step S21 is, for example, a frame extracted from the reception queues 12-1 to 12-N by each of the destination determination units 14-1 to 14-N included in the forwarding processing unit 14. Hereinafter, the frame acquired in step S21 will be referred to as a target frame.

Then, the forwarding processing unit 14 acquires a transmission source MAC address and a VLAN ID (transmission source information) included in header information attached to a target frame (step S22).

The forwarding processing unit 14 searches the FDB 13 for an entry (referred to as a target entry) including the VLAN ID and transmission source MAC address acquired in step S22 to determine whether the FDB 13 includes a target entry (step S23).

The fact that the FDB 13 includes a target entry means that an entry (destination determination information) indicating that an external communication device to which a MAC address included in the target entry is assigned is connected to a communication port (communication port identified by the port identifier) belonging to a VLAN identified by the VLAN ID included in the target entry, has already been registered in the FDB 13.

Therefore, when the determination unit 14*a* determines that the FDB 13 includes a target entry (YES in step S23), the forwarding processing unit 14 updates the last reception time included in the target entry to the current time (step S24).

On the other hand, when the determination unit 14*a* determines that the FDB 13 includes no target entry (NO in step S23), the forwarding processing unit 14 adds a new entry to the FDB 13 (step S25).

In the FDB 13, it is necessary to manage the correspondence among the port identifier, MAC address and VLAN ID. The communication port to which an external communication device that has transmitted a target frame (that is, an external communication device to which the transmission source MAC address included in the target frame is assigned) is connected, can be specified from the reception queues and the like from which the target frame is extracted.

In step S25, therefore, an entry including the port identifier for identifying the communication port specified as described above, the transmission source MAC address and VLAN ID acquired in step S22, and the current time (last reception time) is added to the FDB 13.

When the process of step S25 is performed and thus the switching device 10 receives a frame including the MAC address included in the entry added in step S25 as a destination MAC address, a communication port identified by the port identifier included in the entry by referring to the entry, can be determined as a destination port.

Note that the capacity of the FDB 13 is finite. Assume that if there is no free capacity in the FDB 13 when the process of step S25 is executed, the entry with the earliest (oldest) last reception time is deleted and a new entry is added to the FDB 13. The FDB 13 can thus preferentially hold (store) entries based on frames whose transmission time is close to the current time. However, the entry switching algorithm of the FDB 13 is not limited to this.

In addition to the update processing of the FDB 13 described with reference to FIG. 4, a switch administrator or the like can manually add or delete an entry. In this case, for example, the management unit 16 receives a control command or the like from the administrator to perform the update processing of the FDB 13.

Incidentally, a network such as an industrial network and an in-vehicle network may require high real-time performance. As a standard for achieving high real-time performance on the network, time-sensitive networking (TSN) is being standardized by the IEEE 802.1 TSN Task Group. The TSN is a standard which is an extension of audio/video bridging (AVB) that realizes low delay, which is used in, for example, professional audio. The TSN aims to achieve higher reliability in addition to higher real-time performance than the AVB.

The TSN has a plurality of standards (standard group), and one of the standards is IEEE 802.1 Qbu/IEEE 802.3 br (FPE: frame preemption). In the switching device 10 according to the first comparative example of the first embodiment, the communication processing units 11-1 to 11-N include one MAC. In the FPE, however, an express MAC for high priority (referred to as eMAC hereinafter) and a preemptable MAC (referred to as pMAC hereinafter) for low priority are used.

According to the FPE described above, when a high-priority frame (express frame of FPE) forward process is performed during the forward (transmission) process of a low-priority frame (preemptable frame of FPE), the transmission process of the low-priority frame can be interrupted to forward the high-priority frame. Note that the forward process of the low-priority frame is restarted after the forward process of the high-priority frame is completed.

It is difficult to achieve high real-time performance in a network configured using the switching device 10 according to the first comparative example of the first embodiment described above. A switching device that is adapted to the FPE (standard) can reduce a delay of forward processing for a high-priority frame and achieve high real-time performance as compared with the switching device 10.

An example of a configuration of a switching device that is adapted to the FPE (referred to as a switching device according to the second comparative example of the first embodiment will be described below with reference to FIG. 5. In the following descriptions of the second comparative example, components similar to those of the switching device according to the first comparative example of the first embodiment are not described in detail.

FIG. 5 shows a switching device 20 including N communication processing units 21-1 to 21-N, N first reception queues (eRx) 22-1a to 22-Na, N second reception queues (pRx) 22-1b to 22-Nb, an FDB 23, a forwarding processing unit 24, N first transmission queues (eTx) 25-1a to 25-Na, N second transmission queues (pTx) 25-1b to 25-Nb, and a management unit 26.

In the second comparative example of the first embodiment, the communication processing units 21-1 to 21-N are adapted to the FPE, and the second comparative example differs from the first comparative example in that two MACs of eMAC 21a and pMAC 21b are included. Note that a PHY 21c included in the communication processing units 21-1 to 21-N corresponds to the PHY 11b included in the communication processing units 11-1 to 11-N in the first comparative example of the first embodiment.

In the second comparative example of the first embodiment, the frames received by the communication processing units 21-1 to 21-N include a real-time frame and a best-effort frame. The real-time frame is defined as a frame requiring high real-time performance for forward processing and requiring forward processing with low delay, and corresponds to, for example, the express frame of FPE described above. The best-effort frame is a frame other than the real-time frame, and corresponds to, for example, the preemptable frame of FPE described above. It is assumed that whether a frame transmitted from the external communication devices 1-1 to 1-N is a real-time frame or a best-effort frame is set outside the switching device 20 (for example, external communication devices 1-1 to 1-N).

In the foregoing example, the real-time frame and the best-effort frame can be distinguished from each other by referring to SFD and SMD fields of the received Ethernet frame. For example, a value defined by SMD-E (0xD5) may be identified as a real-time frame (express frame of FPE), and SMD-S 0 to 3 (0xE6, 0x4C, 0x7F, 0xB3) and SMD-C 0 to 3 (0x61, 0x52, 0x9E, 0x2A) may be identified as a best-effort frame (preemptable frame of FPE). Since the express frame of FPE is received by the eMAC and the preemptable frame of FPE is received by the pMAC, the frame may be identified according to which MAC receives the frame.

When the communication processing units 21-1 to 21-N receive, for example, a real-time frame, the real-time frame is output to the first reception queues 22-1a to 22-Na via the eMAC 21a (and the PHY 21c). When the communication processing units 21-1 to 21-N receive, for example, a best-effort frame, the real-time frame is output to the second reception queues 22-1b to 22-Nb via the pMAC 21b (and the PHY 21c).

The N first reception queues 22-1a to 22-Na correspond to the N communication processing units 21-1 to 21-N, and are queues for use in forwarding real-time frames from the communication processing units 21-1 to 21-N to the forwarding processing unit 24. As described above, the real-time frames output from the communication processing units 21-1 to 21-N are stored in the first reception queues 22-1a to 22-Na.

The N second reception queues 22-1b to 22-Nb correspond to the N communication processing units 21-1 to 21-N, and are queues for use in forwarding best-effort frames from the communication processing units 21-1 to 21-N to the forwarding processing unit 24. As described above, the best-effort frames output from the communication processing units 21-1 to 21-N are stored in the second reception queues 22-1b to 22-Nb.

Like the FDB 13 in the first comparative example of the first embodiment, the FDB 23 stores destination determination information (entries) including a port identifier, a MAC address, a VLAN ID, and the last reception time in association with each other.

The forwarding processing unit 24 includes N destination determination units 24-1 to 24-N corresponding to the N first reception queues 22-1a to 22-Na and N second reception queues 22-1b to 22-Nb (that is, communication ports 1 to N).

The destination determination units 24-1 to 24-N extract the real-time frames from the first reception queues 22-1a to 22-Na, and refer to the FDB 23 (the destination determination information stored in the FDB 23) to determine destination ports for the real-time frames.

The destination determination units 24-1 to 24-N also extract the best-effort frames from the second reception queues 22-1b to 22-Na, and refer to the FDB 23 (the destination determination information stored in the FDB 23) to determine destination ports for the best-effort frames.

For example, when a destination port for a real-time frame (a frame extracted from each of the first reception queues 22-1a to 22-Na) is determined, the real-time frame is output to the first transmission queue corresponding to the destination port.

On the other hand, for example, when a destination port for a best-effort frame (a frame extracted from each of the second reception queues 22-1b to 22-Nb) is determined, the best-effort frame is output to the second transmission queue corresponding to the destination port.

The N first transmission queues 25-1a to 25-Na correspond to the N communication processing units 21-1 to 21-N (that is, communication ports 1 to N). The first transmission queues 25-1a to 25-Na are queues for use in forwarding the real-time frames from the forwarding processing unit 24 (destination determination units 24-1 to 24-N) to the communication processing units 21-1 to 21-N. As described above, the real-time frame output from each of the destination determination units 24-1 to 24-N included in the forwarding processing unit 24 to the first transmission queue corresponding to the destination port is stored in the first transmission queue.

As described above, the real-time frames stored in the first transmission queues 25-1a to 25-Na are extracted by the communication processing units 21-1 to 21-N and transmitted to the external communication devices 1-1 to 1-N via the eMAC 21a (and the PHY 21c).

The N second transmission queues 25-1b to 25-Nb correspond to the N communication processing units 21-1 to 21-N (that is, communication ports 1 to N). The second transmission queues 25-1b to 25-Nb are queues for use in forwarding the best-effort frames from the forwarding processing unit 24 (destination determination units 24-1 to 24-N) to the communication processing units 21-1 to 21-N. As described above, the best-effort frame output from each of the destination determination units 24-1 to 24-N included in the forwarding processing unit 24 to the second transmission queue corresponding to the destination port is stored in the second transmission queue.

As described above, the best-effort frames stored in the second transmission queues 25-1b to 25-Nb are extracted by the communication processing units 21-1 to 21-N and transmitted to the external communication devices 1-1 to 1-N via the pMAC 21b (and the PHY 21c).

As will be described later, the destination determination units 24-1 to 24-N hold information indicating whether each TC uses the first transmission queue (eTx) or the second transmission queue (pTx) (information indicating a correspondence between the TC and the transmission queue). Therefore, depending on the setting of the correspondence information, real-time frames (frames extracted from the first reception queue 22-1a to 22-Na) may be output to the second transmission queue corresponding to the destination port, and best-effort frames (frames extracted from the second reception queues 22-1b to 22-Nb) may be output to the first transmission queue corresponding to the destination port.

The management unit 26 corresponds to the management unit 16 in the first comparative example of the first embodiment, and performs a process for initializing, starting and stopping the switching device 20, updating the FDB 23 (adding and deleting entries), managing statistical information, and the like.

Figure 6:
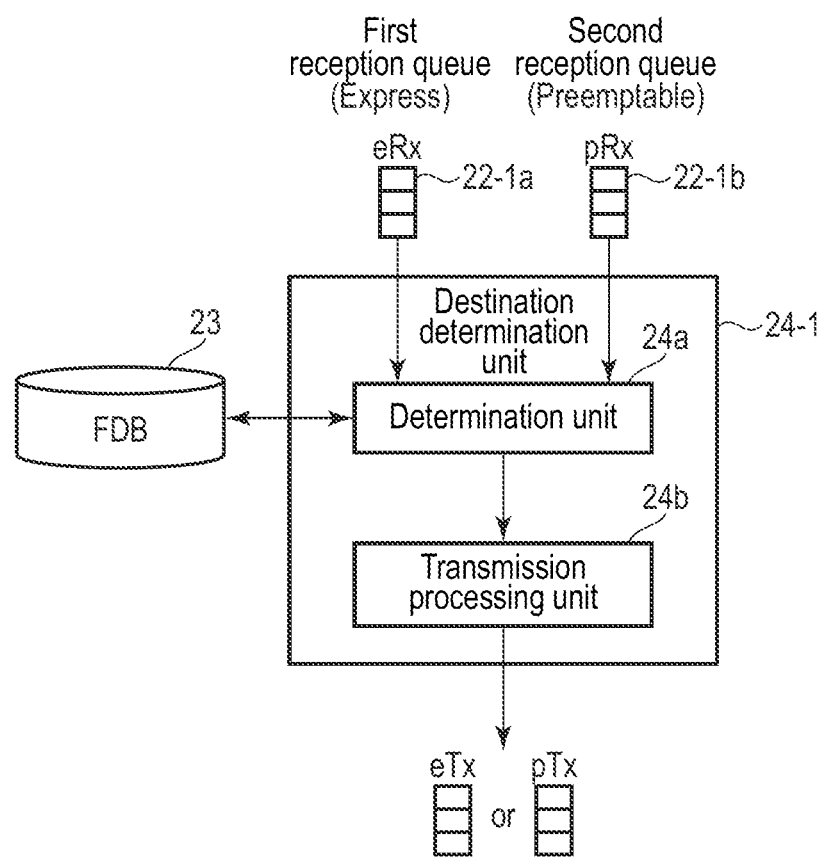
FIG. 6 is a block diagram illustrating an example of a configuration of a destination determination unit included in a forwarding processing unit.

An example of a configuration of the destination determination unit 24-1 included in the forwarding processing unit 24 shown in FIG. 5 will be described below with reference to FIG. 6. As shown in FIG. 6, the destination determination unit 24-1 includes a determination unit 24a and a transmission processing unit 24b.

The determination unit 24a extracts a real-time frame from the first reception queue 22-1a corresponding to the destination determination unit 24-1 and accesses the FDB 23 (destination determination information stored in the FDB 23) based on header information added to the real-time frame to determine a destination port for the real-time frame.

The determination unit 24a extracts a best-effort frame from the second reception queue 22-1b corresponding to the destination determination unit 24-1 and accesses the FDB 23 (destination determination information stored in the FDB 23) based on header information added to the best-effort frame to determine a destination port for the best-effort frame.

The transmission processing unit 24b outputs the real-time frame extracted from the first reception queue 22-1a to the first transmission queue (first transmission queue of the destination) or the second transmission queue (second transmission queue of the destination) corresponding to the destination port determined by the determination unit 24a.

The transmission processing unit 24b outputs the best-effort frame extracted from the second reception queue 22-1b to the first transmission queue (first transmission queue of the destination) or the second transmission queue (second transmission queue of the destination) corresponding to the destination port determined by the determination unit 24a.

The configuration of the destination determination unit 24-1 included in the forwarding processing unit 24 has been described so far. The same holds true of the configurations of the other destination determination units 24-2 to 24-N.

Note that the destination determination units 24-1 to 24-N in the second comparative example of the first embodiment perform the same process as the foregoing process shown in FIG. 3, except that they extract frames from the first reception queues 22-1a to 22-Na and the second reception queues 22-1b to 22-Nb and output the frames to the first and second transmission queues.

In this case, the determination unit 24a selects one of the first and second reception queues 22-1a and 22-1b to extract a frame. Assume here that, for example, the first reception queue 22-1a is preferentially selected when a frame is extracted because the real-time frame requires a forward process with low delay. In other words, the determination unit 24a preferentially extracts a real-time frame from the first reception queue 22-1a, and operates to extract a best-effort frame from the second reception queue 22-1b if the first reception queue 22-1a includes no real-time frame. However, the determination unit 24a may select a reception queue to extract a frame in a round-robin manner, for example.

Furthermore, in the second comparative example of the first embodiment, there are two transmission queues (first and second transmission queues) in a communication port, and thus the transmission processing unit 24b needs to determine which of the first and second transmission queues for the destination port to output a frame. Assume in this case that the transmission processing unit 24b specifies a transmission queue to which a frame is to be output based on the TC described with reference to FIG. 3. Also, assume that information indicating whether each TC uses the first transmission queue (eTx) or the second transmission queue (pTx) is held in advance in the transmission processing unit 24b (for example, a frame preemption status table).

Here is a description of access to the FDB 23 of the switching device 20 according to the second comparative example of the first embodiment. In order to achieve high real-time performance in the FPE (TSN) described above, it is important to reduce the maximum value of delay time and jitter (fluctuation of response time) when gaining access to the FDB 23.

If, in this case, for example, destination determination information stored in the FDB 23 provided in the switching device 20 according to the second comparative example is managed using a contact addressable memory (CAM) (that is, the FDB 23 is achieved by the CMA), it is possible to gain access to the FDB 23 with low delay and low jitter. When the CAM is implemented by hardware, it is possible to search for destination determination information (target entry) in a one-clock cycle, for example.

Since the capacity of the FDB 23 affects the number of devices connected to the switching device 20, the FDB 23 is preferably increased in capacity. Since, however, the CAM is configured to operate a large number of comparators in parallel to decrease delay and jitter, it consumes a large number of hardware resources and its capacity is difficult to increase. When the switching device 20 is applied to, for example, a field programmable gate array (FPGA) or an embedded system, the hardware resources are more difficult to secure (that is, the capacity of the FDB 23 is more difficult to increase).

In this case, the capacity of the FDB 23 can be increased by managing the destination determination information using a hash table by an SDRAM, an SRAM (BRAM) or the like. In this configuration, however, the delay time (search time) is longer and the real-time performance is more difficult to achieve than in the case where the CAM is used. In addition, when a hash table is used, a hash collision is likely to occur, and the occurrence of the hash collision may be a factor in causing a fluctuation (jitter) in response time. The increase in the capacity of the FDB 23 itself may cause jitter to occur.

Therefore, the switching device according to the first embodiment is configured to both increase the capacity of the FDB and decrease delay time (and jitter) to achieve real-time performance.

An example of a configuration of a switching device according to the first embodiment will be described below with reference to FIG. 7. In the following descriptions of the first embodiment, components similar to those of the switching device according to the second comparative example of the first embodiment will not be described in detail.

As shown in FIG. 7, a switching device 30 includes N communication processing units 31-1 to 31-N, N first reception queues (eRx) 32-1a to 32-Na, N second reception queues (pRx) 32-1b to 32-Nb, an eFDB 33a, a pFDB 33b, a forwarding processing unit 34, N first transmission queues (eTx) 35-1a to 35-Na, N second transmission queues (pTx) 35-1b to 35-Nb, and a management unit 26.

Like the switching device 20 according to the second comparative example of the first embodiment, the switching device 30 according to the first embodiment is a switching device that is adapted to the FPE, and different from the switching device 20 according to the second comparative example in that it includes the eFDB 33a and pFDB 33b (in other words, it uses two FDBs).

The eFDB 33a is an FDB for the real-time frame described above. It is possible to gain access to the eFDB 33a (to the destination determination information) (that is, the eFDB 33a can search for entries) at higher speed and with lower delay than the pFDB 33b. Specifically, the capacity (the number of entries) of the eFDB 33a is limited, but the eFDB 33a uses a CAM to manage the destination determination information in order to decrease delay time.

The pFDB 33b is an FDB for the best-effort frame described above, and may be configured to have a larger capacity than the eFDB 33a. Specifically, the delay time and jitter of the pFDB 33b are greater than those of the eFDB 33a, but the pFDB 33b is implemented by an SDRAM or the like to manage more destination determination information (entries). In addition, the destination determination information stored in the pFDB 33b is managed using a hash table, for example.

Note that "managing the destination determination information using a hash table" means managing the destination determination information (entries) using a hash value calculated using a predetermined hash function from at least part of the destination determination information (port identifier, MAC address, and VLAN ID). This management makes it possible to decrease the circuit scale of the pFDB 33b and thus increase the number of items of destination determination information (entries) managed by the pFDB 33b further.

The forwarding processing unit 34 includes N destination determination units 34-1 to 34-N. The destination determination units 34-1 to 34-N extract the real-time frames from the first reception queues 32-1a to 32-Na and refer to the eFDB 33a (destination determination information stored in the eFDB 33a) to determine a destination port for the real-time frames.

The destination determination units 34-1 to 34-N extract the best-effort frames from the second reception queues 32-1b to 32-Nb and refer to the pFDB 33b (destination determination information stored in the pFDB 33b) to determine a destination port for the best-effort frames.

The N communication processing units 31-1 to 31-N, N first reception queues (eRx) 32-1a to 32-Na, N second reception queues (pRx) 32-1b to 32-Nb, N first transmission queues (eTx) 35-1a to 35-Na, N second transmission queues (pTx) 35-1b to 35-Nb, and management unit 36 are similar to the N communication processing units 21-1 to 21-N, N first reception queues (eRx) 22-1a to 22-Na, N second reception queues (pRx) 22-1b to 22-Nb, N first transmission queues (eTx) 25-1a to 25-Na, N second transmission queues (pTx) 25-1b to 25-Nb, and management unit 26 in the second comparative example of the first embodiment, and thus their detailed descriptions will be omitted here.

Figure 8:
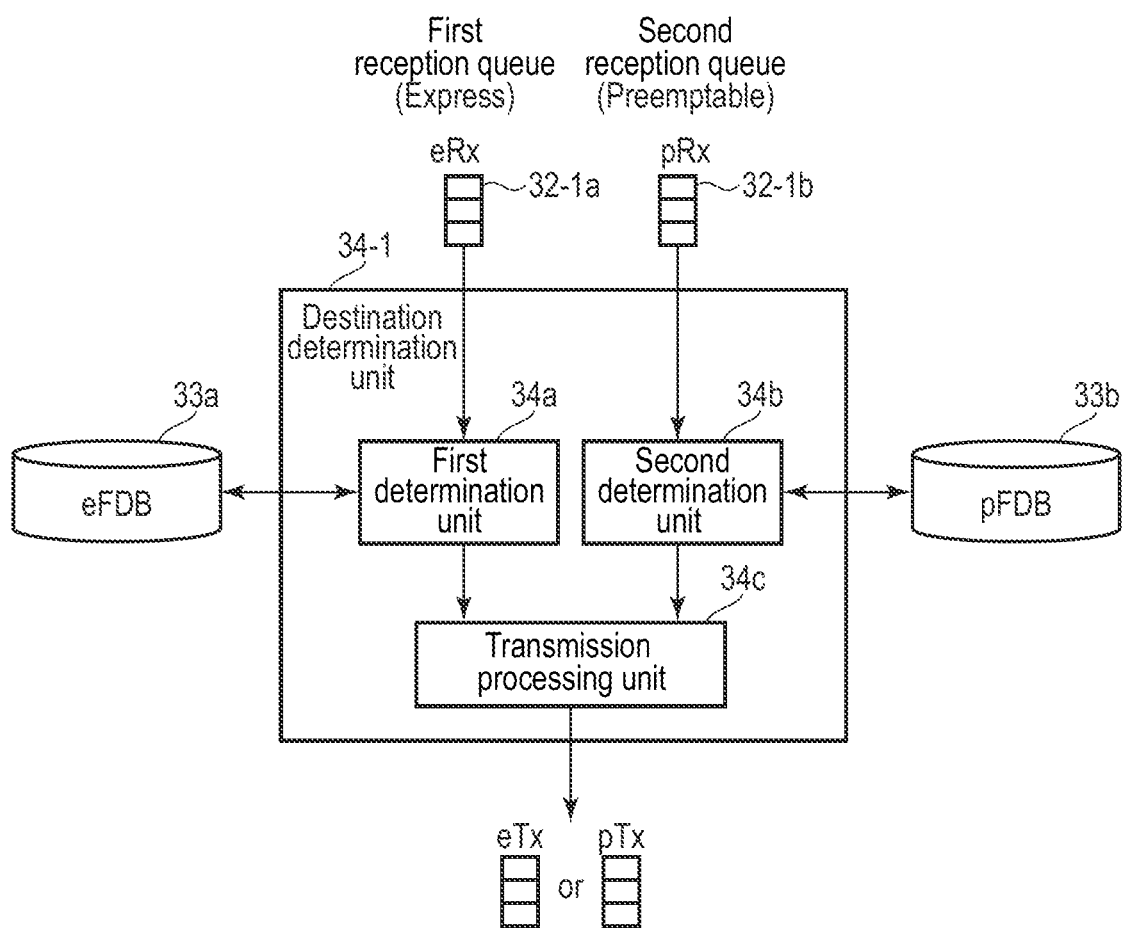
FIG. 8 is a block diagram illustrating an example of a configuration of a destination determination unit included in a forwarding processing unit.

An example of a configuration of the destination determination unit 34-1 included in the forwarding processing unit 34 shown in FIG. 7 will be described below with reference to FIG. 8. As shown in FIG. 8, the destination determination unit 34-1 includes a first determination unit 34a, a second determination unit 34b, and a transmission processing unit 34c.

The first determination unit 34a extracts a real-time frame from the first reception queue 32-1a corresponding to the destination determination unit 34-1 and accesses the eFDB 33a (destination determination information stored in the eFDB 33a) based on header information added to the real-time frame to determine a destination port for the real-time frame.

The second determination unit 34b extracts a best-effort frame from the second reception queue 32-1b corresponding to the destination determination part 34-1 and accesses the pFDB 33b (destination determination information stored in the pFDB 33b) based on header information added to the best-effort frame to determine a destination port for the best-effort frame.

The transmission processing unit 34c outputs the real-time frame extracted from the first reception queue 32-1a to the first or second transmission queue corresponding to the destination port determined by the first determination unit 34a.

The transmission processing part 34c outputs the best-effort frame extracted from the second reception queue 32-1b to the first or second transmission queue corresponding to the destination port determined by the second determination unit 34b.

The configuration of the destination determination unit 34-1 included in the forwarding processing unit 34 has been described. The same holds true of the configurations of the other destination determination units 34-2 to 34-N.

The destination determination units 34-1 to 34-N in the first embodiment perform the same process as in the second comparative example of the first embodiment, except that they refer to the eFDB 33a to determine a destination port for the real-time frame extracted from the first reception queue 32-1a and refer to the pFDB 33b to determine a destination port for the best-effort frame extracted from the second reception queue 32-1b.

In the first embodiment, the switching device 30 is a simple switching device that is adapted to the FPE. A specific application example of the switching device 30 will be briefly described below with reference to FIG. 9. Here is a description of only differences from the switching device 30 shown in FIG. 7.

There is IEEE 802.1 Qbv (TAS: time-aware shaper) as a standard other than FPE among a plurality of standards constituting the TSN. According to the TAS, if a plurality of transmission queues (transmission buffers) having different priorities are controlled in accordance with preset transmission schedule information (gate control list), frame transmission timing can be strictly controlled for each priority (TC). Each of the transmission queues in the TAS is provided with a gate for permitting a frame to be transmitted. When the gate is open, a frame is permitted to be transmitted. When the gate is closed, a frame is prohibited from being transmitted.

Figure 9:
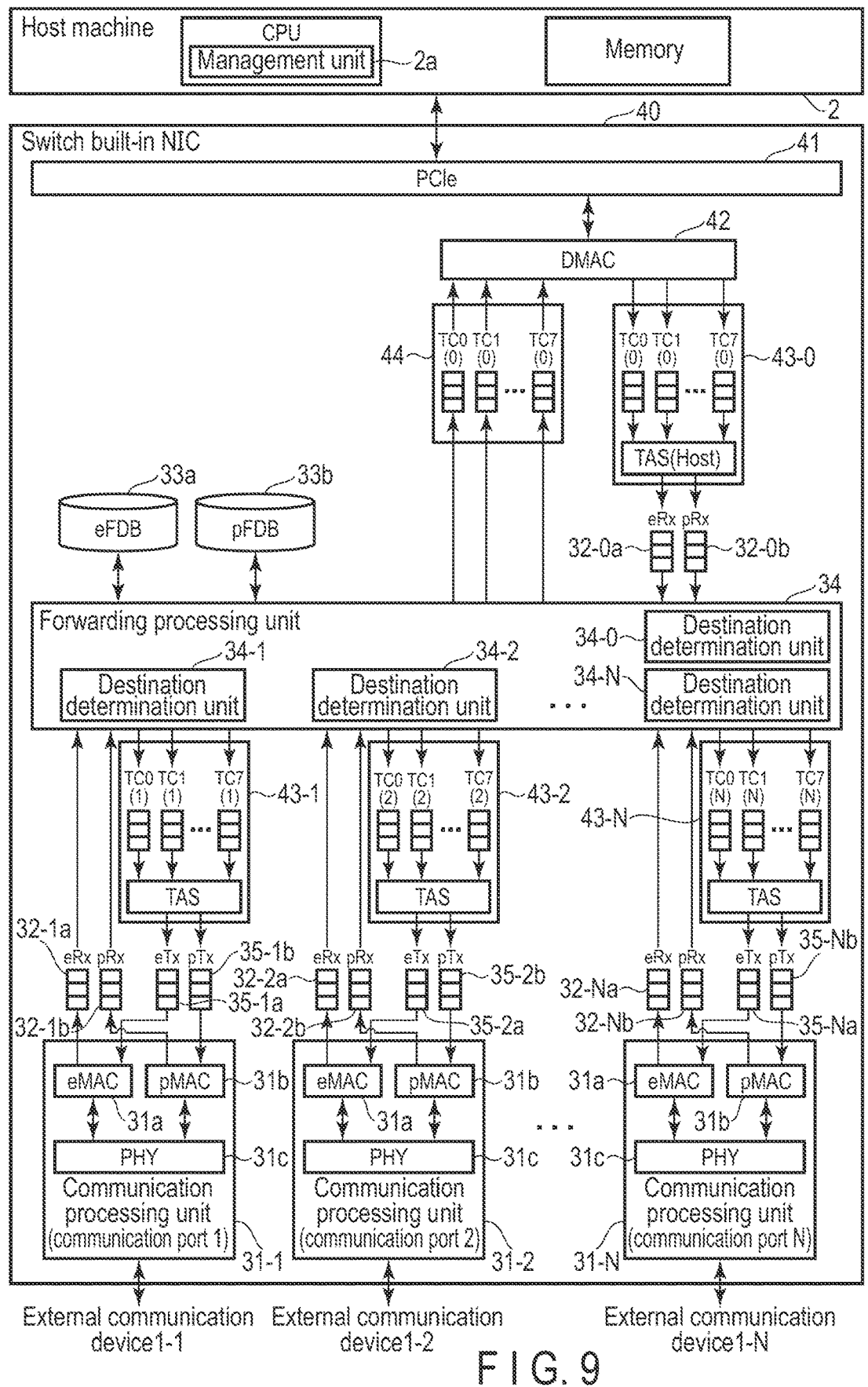
FIG. 9 is a block diagram illustrating a specific application example of the switching device according to the first embodiment.

FIG. 9 shows a switching device 40 that is achieved as a switch built-in network interface card (NIC) in which a switching device corresponding to the TAS is built in addition to the FPE described above.

Assume in the example shown in FIG. 9 that the switching device 40 is connected to N external communication devices 1-1 to 1-N through N communication interfaces (communication ports 1 to N) and is also connected to a host machine 2 including a CPU, a memory, etc., through PCI Express (PCIe) (registered trademark).

That is, the switching device 40 shown in FIG. 9 is configured to, for example, forward a frame from the host machine 2 to the external communication devices 1-1 to 1-N or forward frames from the external communication devices 1-1 to 1-N to the host machine 2 or another external communication device.

As shown in FIG. 9, the switching device 40 includes a PCIe interface 41, a DMAC 42, TAS processing units 43-0 to 43-N, and a reception queue 44.

The PCIe interface 41 is an interface that connects the switching device 40 and the host machine 2.

The DMAC 42 receives a frame from the host machine 2 through the PCIe interface 41 and outputs the frame to the TAS processing unit 43-0. The DMAC 42 extracts a frame from the reception queue 44 and transmits it to the host machine 2 through the PCIe interface 41.

The TAS processing unit 43-0 corresponds to the host machine 2 and performs a TAS process for the frame transmitted from the host machine 2. The TAS processing unit 43-0 includes, for example, transmission queues TC0(0) to TC7(0) and a TAS (host), and determines the transmission timing of the frame according to the preset schedule information (gate control list). The gate control list includes, for example, the state of gates of queues corresponding to eight TCs (TC0 to TC7) for each time interval. The state of gates indicates whether transmission in a queue corresponding to each TC is permitted. Based on the gate control list, the TAS processing unit 43-0 can perform an operation of extracting a frame from a transmission queue whose gate is open and then outputting the frame.

The frames (real-time frame and best-effort frame) output from the TAS processing unit 43-0 are stored in a reception queue 32-0a (eRx) similar to the first reception queues 32-1a to 32-Na shown in FIG. 7 and the reception queue 32-0b (pRx) similar to the second reception queues 32-1b to 32-Nb shown in FIG. 7.

The TAS processing unit 43-0 has been described so far. The TAS processing units 43-1 to 43-N correspond to the external communication devices 1-1 to 1-N (communication ports 1-N), and perform a process similar to the process to be performed by the TAS processing unit 43-0.

The reception queue 44 is used to forward a frame from the forwarding processing unit 34 to the DMAC 42.

The TAS is a process on the transmission side. In the example shown in FIG. 9, the TAS processing unit 43-0 is provided in the reception direction from the host machine 2 to the switching device 40. That is, the TAS processing unit 43-0 is implemented so as to regard the host machine 2 as an external communication device connected to the switching device 40 and to perform a transmission process (TAS process) of the external communication device.

On the other hand, a switching device adapted to the TAS requires a TAS process in all transmission directions. Since, however, a bus connected to the host machine 2 does not share a network with other communication device, it is assumed that the effect of avoiding a plurality of traffic collisions by performing the TAS process is small. In the example shown in FIG. 9, therefore, no TAS processing unit is provided in the transmission direction from the switching device 40 to the host machine 2.

The configuration shown in FIG. 9 is, however, one example. In this example, for example, a TAS processing unit may be provided in the transmission direction from the external communication devices 1-1 to 1-N to the host machine 2 (between the reception queue 44 and the DMAC 42) and the TAS (host) can be removed from the TAS processing unit 43-0.

Since the other configurations of the switching device 40 shown in FIG. 9 are the same as those described in the first embodiment (the switching device 30 shown in FIG. 7), their detailed descriptions will be omitted. However, the forwarding processing unit 34 further includes a destination determination unit 34-0 corresponding to the first and second reception queues alongside the host machine 2 in addition to the destination determination units 34-1 to 34-N.

Assume in the example shown in FIG. 9 that the switching device 40 includes no equivalent for the management unit 36 in the first embodiment but the host machine 2 includes a management unit 2a corresponding to the management unit 36. Also, assume that the management unit 2a is implemented, for example, by the case where the CPU of the host machine 2 executes a predetermined program (software).

The operation of the forwarding processing unit 34 included in the switching device 40 will be briefly described below with reference to FIG. 10.

As shown in FIG. 10, the destination determination units 34-0 to 34-N included in the forwarding processing unit 34 includes an eXmitter and a pXmitter. The eXmitter performs a process similar to the process to be performed by, for example, the first determination unit 34a (and the transmission processing unit 34c) shown in FIG. 8, and the pXmitter performs a process similar to the process to be performed by, for example, the second determination unit 34b (and the transmission processing unit 34c) shown in FIG. 8.

The forwarding processing unit 34 includes N+1 selectors corresponding to the host machine 2 and the communication ports 1 to N (external communication devices 1-1 to 1-N). In FIG. 10, the selector corresponding to the host machine 2 is shown as a selector S(0), and the selectors corresponding to the communication ports 1 to N are shown as selectors S(1) to S(N).

For example, when a real-time frame is extracted from the first reception queue 32-0a by the eXmitter included in the destination determination unit 34-0, the eXmitter refers to the eFDB 33a based on header information added to the real-time frame to determine a destination port for the real-time frame. The eXmitter outputs the real-time frame to a selector corresponding to the determined destination port. Since the real-time frame (that is, the real-time frame transmitted from the host machine 2) extracted from the first reception queue 32-0a is forwarded to the external communication devices 1-1 to 1-N other than the host machine 2, the eXmitter included in the destination determination unit 34-0 transmits the real-time frame to the selectors S(1) to S(N) other than the selector S(0).

When a best-effort frame is extracted from the second reception queue 32-0b by the pXmitter included in the destination determination unit 34-0, the pXmitter refers to the pFDB 33b based on header information added to the best-effort frame to determine a destination port for the best-effort frame. The pXmitter outputs the best-effort frame to a selector corresponding to the determined destination port. Since the best-effort frame (that is, the best-effort frame transmitted from the host machine 2) extracted from the second reception queue 32-0b is forwarded to the external communication devices 1-1 to 1-N other than the host machine 2, the pXmitter included in the destination determination unit 34-0 transmits the best-effort frame to the selectors S(1) to S(N) other than the selector S(0).

In addition, for example, the selector S(0) (a selector corresponding to the host machine 2) receives frames from the destination determination units 34-1 to 34-N (eXmitters and pXmitters included in the destination determination units 34-1 to 34-N) other than the destination determination unit 34-0 corresponding to the host machine 2, and outputs the received frames to one of the transmission queues TC0 to TC7 specified (selected) by the TC. The TC for specifying a transmission queue for outputting a frame is obtained by executing a process corresponding to the foregoing process shown in FIG. 3 by the destination determination unit 34-0.

Although the destination determination unit 34-0 and the selector S(0) have been described so far. The same holds true of the other destination determination units 34-1 to 34-N and the selectors S(1) to S(N).

In FIG. 10, the eXmitter in the destination determination units 34-0 to 34-N, which extracts real-time frames from the first reception queues 32-0a to 32-Na, is shown as eX(0) to eX(N), and the pXmitter in the destination determination units 34-0 to 34-N, which extracts best-effort frames from the second reception queues 32-0b to 32-Nb, is shown as pX(0) to pX(N).

The case where the switching device according to the first embodiment is implemented as a switch built-in NIC incorporating a switching device adapted to the FPE and TAS has been described. However, the switching device may be implemented in another manner.

As described above, in the first embodiment, when a frame received from the external communication device 1-1 (first external communication device) connected to the communication port 1 (first communication port) is a real-time frame (first frame to be forwarded with low delay), a destination port is determined by accessing destination determination information (information used to determine the second communication port to which the second external communication device serving as a destination of the frame is connected) stored in the eFDB 33a (first database) based on header information attached to the real-time frame. On the other hand, when the received frame is a best-effort frame (second frame different from the first frame), a destination port is determined by accessing destination determination information stored in the pFDB 33b (second database) based on header information attached to the best-effort frame. In the first embodiment, the eFDB 33a can gain access to the destination determination information at higher speed than the pFDB 33b.

Since, in the first embodiment, an FDB is prepared for each of the real-time and best-effort frames as described above, delay time (and jitter) in forwarding the real-time frame is decreased, with the result that the capacity of the FDB can be increased by adding the pFDB 33b as compared with the configuration having the eFDB 33a. In other words, the first embodiment makes it possible to achieve both a decrease in delay time and an increase in the capacity of the FDB (database).

Figure 4:
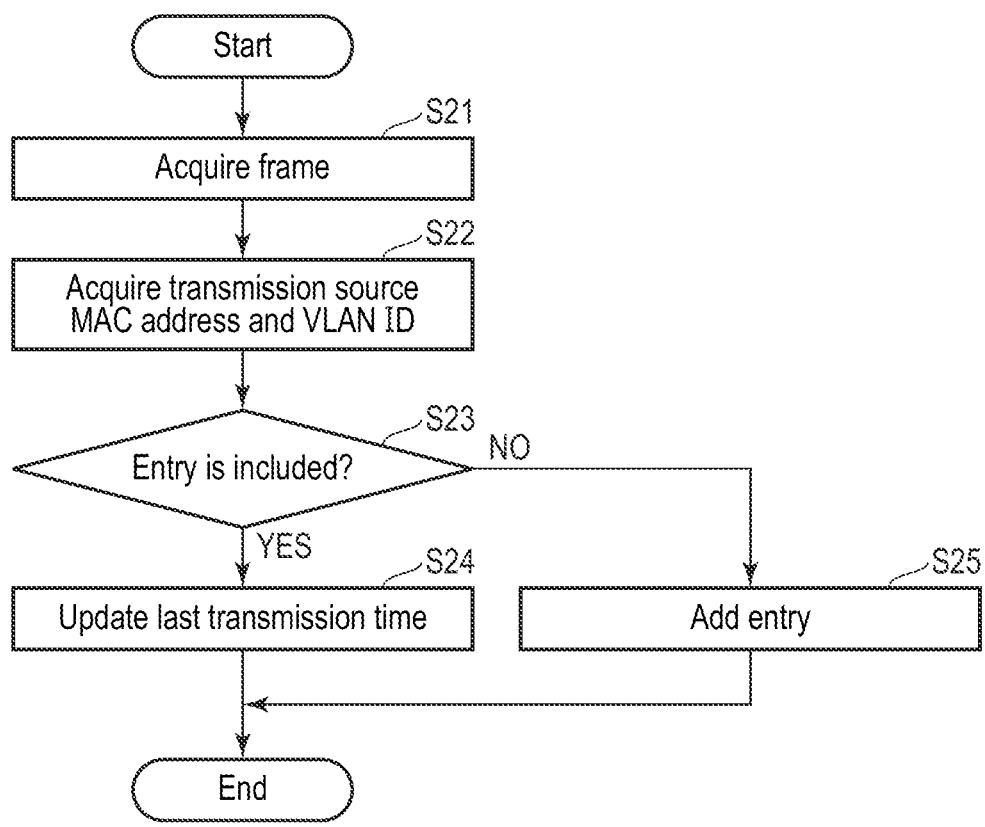
FIG. 4 is a flowchart showing an example of a processing procedure of FDB update processing.

In the first embodiment, the eFDB 33a may be updated by performing the process shown in FIG. 4 when real-time frames are received from the external communication devices 1-1 to 1-N, and the pFDB 33b may be updated by performing the process shown in FIG. 4 when best-effort frames are received from the external communication devices 1-1 to 1-N. The updating process of the eFDB 33a may differ from that of the pFDB 33b.

Specifically, when real-time communication devices (application programs requiring real-time performance) and best-effort communication devices (application programs not requiring real-time performance) are mixed in the N external communication devices 1-1 to 1-N of the first embodiment, it is assumed that the number of real-time communication devices is smaller than the number of best-effort communication devices.

In addition, it is assumed that communication devices (application programs) which perform communications requiring real-time performance such as an emergency signal in an industrial network, an in-vehicle network and the like have few opportunities to be dynamically connected to and disconnected from the network and the number of communication devices is often determined (that is, the number is fixed) when the network is configured.

Therefore, assume in the first embodiment that the destination determination information stored in, for example, the eFDB 33a may not be updated (that is, MAC address learning for the eFDB 33a may be invalidated) when a real-time frame is received. Thus, the eFDB 33a gives priority to real-time performance over updating of the destination determination information, and it is possible to prevent delay time or jitter from increasing when the real-time frame is forwarded in accordance with the updating of the eFDB 33a.

On the other hand, assume that the destination determination information stored in the pFDB 33b is updated (that is, MAC address learning for the pFDB 33b is validated) when a best effort frame is received. Thus, the pFDB 33b is updated each time a best-effort frame is received from, for example, the external communication devices 1-1 to 1-N (adding an entry and the like), with the result that the external communication devices are flexibly connected to and disconnected from the network, and the frames can be forwarded to more external communication devices.

It has been described that the destination determination information stored in the eFDB 33a is not updated when a real-time frame is received. Assume that the eFDB 33a can be updated in response to, for example, an instruction from outside the switching device 40.

As described above, the switching device 30 according to the first embodiment may be configured to perform a different updating process for each of the FDBs (eFDB 33a and pFDB 33b). In this case, the switching device 30 has only to operate such that, for example, the frequency of the updating process of the eFDB 33*a* is lower than that of the updating process of the pFDB 33*b*.

Figure 11:
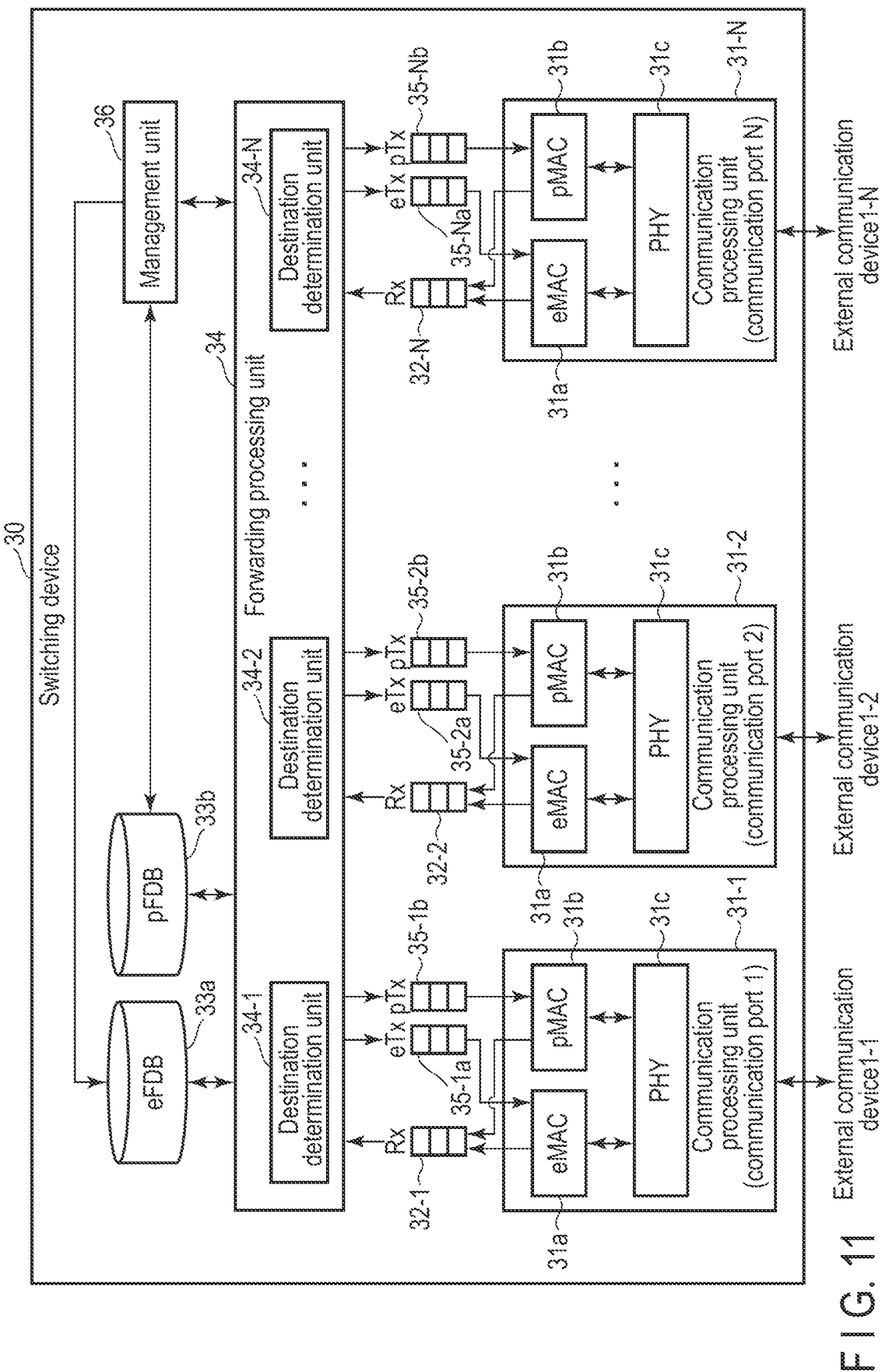
FIG. 11 is a block diagram illustrating an example of a configuration of a switching device according to a first modification to the first embodiment.

The first embodiment has been described on the assumption that one communication port (communication processing unit) includes two reception queues (first and second reception queues), but one communication port may include one reception queue (referred to as a first modification to the first embodiment hereinafter), as shown in FIG. 11, for example. Regarding the first modification, a detailed description of portions similar to those of the switching device according to the first embodiment will be omitted.

In the example shown in FIG. 11, the switching device 30 according to the first modification to the first embodiment includes N reception queues 32-1 to 32-N corresponding to communication ports 1 to N (communication processing units 31-1 to 31-N). For example, the reception queue 32-1 stores real-time frames and best-effort frames which are output from the communication processing unit 31-1 and serialized in sequence. The same holds true of the other reception queues 32-2 to 32-N.

An example of a configuration of a destination determination unit 34-1 included in the forwarding processing unit 34 shown in FIG. 11 will be described below with reference to FIG. 12.

As shown in FIG. 12, the destination determination unit 34-1 includes a determination unit 34*d*. In the first modification to the first embodiment, the determination unit 34*d* refers to the eFDB 33*a* to determine a destination port for the real-time frame and refers to the pFDB 33*b* to determine a destination port for the best-effort frame, as described in the first embodiment.

However, in the first modification, there is one reception queue for storing frames extracted by the determination unit 34*d* (that is, the real-time and best-effort frames are extracted from one reception queue 32-1). The determination unit 34*d* thus needs to determine whether the frame extracted from the reception queue 32-1 is a real-time frame or a best-effort frame.

In the first modification to the first embodiment, therefore, it is assumed that the determination unit 34*d* determines whether a frame extracted from, for example, the reception queue 32-1 is a real-time frame or a best-effort frame, based on the PCP included in header information added to the frame or the TC converted from the PCP. In this case, the determination unit 34*d* can execute the determination process based on the information by previously holding information indicating whether the frame is a real-time frame or a best-effort frame for each PCP or each TC, for example.

When the determination unit 34*d* determines that the frame extracted from the reception queue 32-1 is a real-time frame, it refers to the eFDB 33*a* to determine a destination port for the real-time frame. On the other hand, when the determination unit 34*d* determines that the frame extracted from the reception queue 32-1 is a best-effort frame, it refers to the pFDB 33*a* to determine a destination port for the best-effort frame.

The configuration of the destination determination unit 34-1 included in the forwarding processing unit 34 has been described. The same holds true of the configurations of the other destination determination units 34-2 to 34-N.

Note that the destination determination units 34-1 to 34-N in the first modification to the first embodiment perform processes similar to those in the first embodiment, except that they determine the frames extracted from the reception queues 32-1 to 32-N are real-time frames or best-effort frames.

Furthermore, as shown in FIG. 13, for example, in the first embodiment, one communication port may include m (m is an integer of three or more) reception queues (referred to as a second modification to the first embodiment hereinafter). Regarding the second modification, a detailed description of portions similar to those of the switching device according to the first embodiment will be omitted.

In the example shown in FIG. 13, a switching device 30 according to a second modification to the first embodiment includes N×m reception queues corresponding to communication ports 1 to N (communication processing units 31-1 to 31-N). Specifically, for example, the reception queues corresponding to the communication port 1 are m reception queues 32-11 to 32-1*m*, the reception queues corresponding to the communication port 2 are m reception queues 32-21 to 32-2*m*, and the reception queues corresponding to the communication port N are m reception queues 32-N1 to 32-N*m*. The same applies to the reception queues corresponding to the other communication ports.

In the second modification, the N×m reception queues include reception queues for real-time frames (reception queues in which real-time frames are stored) and reception queues for best-effort frames (reception queues in which best-effort frames are stored). The real-time frames output from, for example, the communication processing unit 31-1 are stored in the reception queues for the real-time frames among the reception queues 32-11 to 32-1*m*. The best-effort frames output from the communication processing unit 31-1 are stored in the reception queues for the best-effort frames among the reception queues 32-11 to 32-1*m*.

The switching device 30 according to the second modification includes an attribute information database (DB) 37 for storing in advance information (referred to as attribute information hereinafter) indicating whether each of the N×m reception queues is a reception queue for real-time frames or a reception queue for best-effort frames.

An example of a configuration of a destination determination unit 34-1 included in the forwarding processing unit 34 shown in FIG. 13 will be described below with reference to FIG. 14.

As shown in FIG. 14, the destination determination unit 34-1 includes a first frame extraction unit 34*e* and a second frame extraction unit 34*f*.

The first frame extraction unit 34*e* extracts a real-time frame from a reception queue for real-time frames among the m reception queues 32-11 to 32-1*m* and outputs the extracted real-time frame to the first determination unit 34*a*.

The second frame extraction unit 34*f* extracts a best-effort frame from a reception queue for best-effort frames among the m reception queues 32-11 to 32-1*m* and outputs the extracted best-effort frame to the second determination unit 34*b*.

In the second modification to the first embodiment, the reception queue for real-time frames and the reception queue for best-effort frames can be distinguished based on the attribute information stored in the attribute information DB 37.

Specifically, in the attribute information stored in the attribute information DB 37, a real-time frame (Express) or a best-effort frame (Preemptable) is set in correspondence with each of the reception queues as shown in FIG. 15, for example. In FIG. 15, Rx1 to Rxm correspond to identification information for identifying, for example, the reception queues 32-11 to 32-1*m*.

The first frame extraction unit 34*e* can identify (specify) a reception queue for real-time frames set in the attribute information (a reception queue for real-time frames) and extract the real-time frame from the reception queue. Similarly, the second frame extraction unit 34f can identify (specify) a reception queue for best-effort frames set in the attribute information (a reception queue for best-effort frames) and extract the best-effort frame from the reception queue.

When there are a plurality of reception queues for real-time frames in the m reception queues 32-11 to 32-1m, the first frame extraction unit 34e extracts a real-time frame according to, for example, priority predetermined for each of the reception queues for real-time frames. This priority has only to be set in, for example, the attribute information DB 37 (attribute information). The first frame extraction unit 34e may operate to extract a real-time frame from the reception queues for real-time frames in a round robin manner, for example.

The case where the first frame extraction unit 34e extracts a real-time frame has been described so far. The same holds true of the case where the second frame extraction unit 34f extracts a best-effort frame.

The configuration of the destination determination unit 34-1 included in the forwarding processing unit 34 has been described so far. The same holds true of the configurations of the other destination determination units 34-2 to 34-N.

The first determination unit 34a and transmission processing unit 34c perform a process similar to that in the first embodiment after the first frame extraction unit 34e extracts a real-time frame (the first frame extraction unit 34e outputs a real-time frame to the first determination unit 34a). The second determination unit 34b and transmission processing unit 34c perform a process similar to that in the first embodiment after the second frame extraction unit 34f extracts a best-effort frame (the second frame extraction unit 34f outputs a best-effort frame to the second determination unit 34b).

According to the first and second modifications to the above first embodiment, even if the number of reception queues provided for one communication port is other than two, it is possible to achieve both reduction in delay time and increase in FDB capacity.

In the first embodiment, the eFDB 33a manages destination determination information using a CAM and the pFDB 33b manages destination determination information using a hash table holding a hash value. If, however, the eFDB 33a is configured to achieve higher-speed access than the pFDB 33b, the eFDB 33a and pFDB 33b may be configured to manage destination determination information in a manner different from that in the first embodiment. In the first embodiment, the capacity of the pFDB 33b, which is referred to when a best-effort frame is forwarded, may be set larger than that of the eFDB 33a.

In the first embodiment, TSN has been described as a standard for achieving real-time performance. The switching device 30 according to the first embodiment may conform to other standards if it is configured to forward frames corresponding to, for example, a real-time frame (Express frame of IEEE 802.1 Qbu/IEEE 802.3 br) and a best-effort frame (Preemptable Frame of IEEE 802.1 Qbu/IEEE 802.3 br).

It is assumed that, for example, the forwarding processing unit 34 and the management unit 36 included in the switching device 30 according to the first embodiment are implemented by hardware. The forwarding processing unit 34 and management unit 36 may be implemented by software.

FIG. 16 shows an example of a hardware configuration of the switching device 30 when the forwarding processing unit 34 and the management unit 36 are implemented by software. As shown in FIG. 16, the switching device 30 includes a CPU 301, a nonvolatile memory 302, a main memory 303, a communication device 304, and the like.

The CPU 301 is a processor that controls the operations of components in the switching device 30. The CPU 301 (the computer of the switching device 30) executes a predetermined program loaded from the nonvolatile memory 302 to the main memory 303 to fulfill the functions of the forwarding processing unit 34 and management unit 36.

The communication device 304 is a device configured to perform communication with the external communication devices 1-1 to 1-N and the like.

In the hardware configuration shown in FIG. 16, the memory areas used for the first reception queues 32-1a to 32-Na, second reception queues 32-1b to 32-Nb, eFDB 33a, pFDB 33b, first transmission queues 35-1a to 35-Na and second transmission queues 35-1b to 35-Nb, which are included in the switching device 30, are secured in the main memory 303, for example. The communication processing units 31-1 to 31-N included in the switching device 30 are included in the communication device 304, for example.

Second Embodiment

Next is a description of a second embodiment. Since the configuration of a switching device according to the second embodiment is similar to that of the switching device according to the first embodiment described above, it will be described with reference to FIG. 7 as appropriate. In the following descriptions, components similar to those of the switching device according to the first embodiment will not be described in detail.

As described in the first embodiment, when a destination port is determined by referring to an eFDB 33a and a pFDB 33b, it is difficult for a plurality of destination determination units 34-1 to 34-N to gain access to the eFDB 33a and pFDB 33b simultaneously. Therefore, the embodiment differs from the first embodiment in that the copies of the eFDB 33a and pFDB 33b (the destination determination information stored in the eFDB 33a and pFDB 33b) are cached and held in the destination determination unit 34-1.

An example of a configuration of the destination determination unit 34-1 included in the forwarding processing unit 34 in the second embodiment will be described with reference to FIG. 17.

As shown in FIG. 17, the destination determination unit 34-1 internally holds an eFDB cache 34g, which is a copy of the eFDB 33a and a pFDB cache 34h, which is a copy of the pFDB 33b, as described in the first embodiment.

The eFDB cache 34g includes destination determination information stored in the eFDB 33a. Like in the eFDB 33a, in the eFDB cache 34g, the destination determination information is managed using a CAM. The pFDB cache 34h includes destination determination information stored in the pFDB 33b. Like in the pFDB 33b, in the pFDB cache 34h, the destination determination information is managed using a hash table.

A first determination unit 34a extracts a real-time frame from a first reception queue 32-1a corresponding to the destination determination unit 34-1 to determine a destination port for the real-time frame based on header information added to the real-time frame and the eFDB cache 34g (the cached destination determination information).

A second determination unit 34b extracts a best-effort frame from a second reception queue 32-1b corresponding to the destination determination unit 34-1 to determine a destination port for the best-effort frame based on header information added to the best-effort frame and the pFDB cache 34*h* (the cached destination determination information).

The configuration of the destination determination unit 34-1 included in the forwarding processing unit 34 has been described. The same holds true of the configurations of the other destination determination units 34-2 to 34-N.

The destination determination unit 34-1 in the second embodiment performs a process similar to that in the first embodiment except that the first determination unit 34*a* refers to the eFDB cache 34*g* to determine a destination port for real-time frames and the second determination unit 34*b* refers to the pFDB cache 34*h* to determine a destination port for best-effort frame.

In the second embodiment, the destination determination information (first destination determination information) stored in the eFDB 33*a* (first database) and the destination determination information (second destination determination information) stored in the pFDB 33*b* (second database) are cached to determine a destination port (second communication port) based on the cached destination determination information. Thus, the destination determination units 34-1 to 34-N included in the forwarding processing unit 34 can operate simultaneously (can refer to the destination determination information), which makes it possible to achieve higher real-time performance.

When the destination determination information stored in the eFDB 33*a* and pFDB 33*b* is cached in the forwarding processing unit 34 (destination determination units 34-1 to 34-N) as described above, it is conceivable that the destination determination units 34-1 to 34-N update the eFDB cache 34*g* and pFDB cache 34*h* (destination determination information) based on, for example, frames received by the switching device 30, as in the updating process of the FDB described above. When the eFDB cache 34*g* and pFDB cache 34*h* are updated as described above, they need to be synchronized with the eFDB 33*a* and pFDB 33*b* (destination determination information stored therein) (referred to as a synchronization process hereinafter).

However, the eFDB cache 34*g* is a copy (cache) of the FDB (eFDB 33*a*) for real-time frames, and the synchronization process between the eFDB 33*a* and the eFDB cache 34*g* involves a process of writing to the eFDB 33*a*. The synchronization process can thus cause an increase in delay and jitter of the forwarding process of the real-time frames.

In the second embodiment, therefore, it is assumed that the synchronization process between the eFDB 33*a* and the eFDB cache 34*g* (the synchronization process between the destination determination information stored in the eFDB 33*a* and the cached destination determination information) is not performed upon receipt of a real-time frame by the switching device 30. Accordingly, the synchronization process can prevent delay and jitter from being caused, with the result that high real-time performance can be achieved in the forwarding process for real-time frames. However, it is assumed that the synchronization process between the eFDB 33*a* and the eFDB cache 34*g* can be performed in response to an instruction from outside the switching device 30.

The synchronization of the eFDB cache 34*g* (destination determination information) with the eFDB 33*a* has been described so far. Assume here that the updating process of the eFDB cache 34*g* itself is not performed, either when a real-time frame is received.

The pFDB cache 34*h* is a copy (cache) of the FDB (pFDB 33*b*) for best-effort frames. In the pFDB cache 34*h*, it is preferable to give priority to managing a large number of entries (destination determination information) rather than decreasing delay and jitter for achieving real-time performance.

In the second embodiment, therefore, the synchronization process between the pFDB 33*b* and the pFDB cache 34*h* (the process of synchronizing the destination determination information stored in the pFDB 33*b* and the cached destination determination information) is performed upon receipt of a best-effort frame in the switching device 30.

Specifically, when the pFDB cache 34*h* held in the destination determination unit 34-1 is updated based on the best-effort frame transmitted from, for example, the external communication device 1-1, the updated pFDB cache 34*h* is synchronized with the pFDB 33*b*. In this case, the pFDB 33*b* synchronized with the pFDB cache 34*h* is also synchronized with a pFDB cache 34*h* held in each of the other destination determination units 34-2 to 34-N. This makes it possible to synchronize the pFDB 33*b* and the pFDB cache 34*h* held in each of the destination determination units 34-1 to 34-N.

Note that the synchronization process between the pFDB 33*b* and the pFDB cache 34*h* may be performed with predetermined timing (timing managed by a timer or the like) after the pFDB cache 34*h* is updated upon receipt of a best-effort frame.

In the second embodiment, the synchronization process between the eFDB 33*a* and the eFDB cache 34*g* is not performed upon receipt of a real-time frame, but the synchronization process between the pFDB 33*b* and the pFDB cache 34*h* is performed upon receipt of a best-effort frame.

The synchronization process between the eFDB 33*a* and the eFDB cache 34*g* has been described as not performed upon receipt of a real-time frame. The switching device 30 according to the second embodiment may be so configured that the frequency of the synchronization process between the eFDB 33*a* and the eFDB cache 34*g* is lower than that of the synchronization process between the pFDB 33*b* and the pFDB cache 34*h*.

In the second embodiment, for example, the pFDB cache 34*h* has been described as a copy of the pFDB 33*b*, but the destination determination information included in the pFDB cache 34*h* may be different from the destination determination information stored in the pFDB 33*b*.

More specifically, the number of items of destination determination information included in the pFDB cache 34*h* (the capacity of the pFDB cache 34*h*) may be smaller than the number of items of destination determination information stored in the pFDB 33*b* (the capacity of the pFDB 33*b*). In this case, the destination determination information included in the pFDB cache 34*h* can be replaced with the destination determination information stored in the pFDB 33*b* according to an algorithm such as least recently used (LRU). In addition, when the pFDB cache 34*h* is updated, the oldest one of the destination determination information included in the pFDB cache 34*h* may be discarded and new destination determination information (entry) may be added. The destination determination information to be discarded may be reflected (added) in the pFDB 33*b*.

The pFDB 33*b* and pFDB cache 34*h* may manage destination determination information using different algorithms.

According to at least one of the embodiments described above, it is possible to provide a switching device, a method and a program capable of both decreasing delay time and increasing the capacity of a database.

While certain embodiments have been described, these embodiments have been presented by way of example only, and are not intended to limit the scope of the inventions. Indeed, the novel embodiments described herein may be embodied in a variety of other forms; furthermore, various omissions, contributions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switching device including a plurality of communication ports, comprising:
a receiving unit configured to receive a frame from a first external communication device connected to a first communication port of the communication ports;
a first database and a second database configured to store destination determination information used to determine a second communication port of the communication ports to which a second external communication device serving as a destination of the received frame, is connected; and
a determination unit configured to determine the second communication port by accessing destination determination information stored in the first database based on header information added to a first frame which is to be forwarded with low delay when the received frame is the first frame, and determine the second communication port by accessing destination determination information stored in the second database based on header information added to a second frame which differs from the first frame when the received frame is the second frame, wherein:
the first database is accessible to the destination determination information at a higher speed than the second database;
the determination unit is configured to cache first destination determination information stored in the first database and second destination determination information stored in the second database, and determine the second communication port based on the cached first and second destination determination information;
the first destination determination information stored in the first database and the cached first destination determination information are not synchronized with each other upon receipt of the first frame; and
the second destination determination information stored in the second database and the cached second destination determination information are synchronized with each other upon receipt of the second frame.

2. The switching device of claim 1, further comprising:
a first reception queue configured to store the first frame; and
a second reception queue configured to store the second frame,
wherein:
the determination unit includes a first determination unit and a second determination unit;
the first determination unit is configured to determine the second communication port based on header information added to the first frame extracted from the first reception queue; and
the second determination unit is configured to determine the second communication port based on header information added to the second frame extracted from the second reception queue.

3. The switching device of claim 2, further comprising a third database configured to store attribute information indicating that the first reception queue is a reception queue for the first frame and the second reception queue is a reception queue for the second frame,
wherein:
the first frame is extracted from the first reception queue distinguished based on the attribute information; and
the second frame is extracted from the second reception queue distinguished based on the attribute information.

4. The switching device of claim 1, further comprising a reception queue configured to store the received frame,
wherein the determination unit is configured to determine whether a frame extracted from the reception queue is the first frame or the second frame based on header information of the frame.

5. The switching device of claim 1, wherein:
the destination determination information stored in the first database is not updated upon receipt of the first frame; and
the destination determination information stored in the second database is updated upon receipt of the second frame.

6. The switching device of claim 1, wherein:
the first database is configured to manage the destination determination information using a content addressable memory (CAM); and
the second database is configured to manage the destination determination information using a hash table which holds a hash value calculated from the destination determination information.

7. The switching device of claim 1, wherein:
the first frame includes an Express frame of IEEE 802.1 Qbu/IEEE 802.3 br; and
the second frame includes a Preemptable frame of IEEE 802.1 Qbu/IEEE 802.3 br.

8. The switching device of claim 1, wherein the second database has a capacity that is larger than a capacity of the first database.

9. A method executed by a switching device including a plurality of communication ports, comprising:
receiving a frame from a first external communication device connected to a first communication port of the communication ports; and
determining a second communication port to which a second external communication device serving as a destination of the received frame is connected, by accessing destination determination information stored in a first database based on header information added to a first frame which is to be forwarded with low delay when the received frame is the first frame, and determining the second communication port by accessing destination determination information stored in a second database based on header information added to a second frame which differs from the first frame when the received frame is the second frame, wherein:
the first database is accessible to the destination determination information at a higher speed than the second database;
the determining comprises caching first destination determination information stored in the first database and second destination determination information stored in the second database, and determining the second communication port based on the cached first and second destination determination information;
the first destination determination information stored in the first database and the cached first destination determination information are not synchronized with each other upon receipt of the first frame; and the second destination determination information stored in the second database and the cached second destination determination information are synchronized with each other upon receipt of the second frame.

10. The method of claim 9, wherein:
the switching device includes a first reception queue configured to store the first frame and a second reception queue configured to store the second frame; and
the determining includes:
determining the second communication port based on header information added to the first frame extracted from the first reception queue; and
determining the second communication port based on header information added to the second frame extracted from the second reception queue.

11. The method of claim 10, wherein:
the switching device further includes a third database configured to store attribute information indicating that the first reception queue is a reception queue for the first frame and the second reception queue is a reception queue for the second frame;
the first frame is extracted from the first reception queue distinguished based on the attribute information; and
the second frame is extracted from the second reception queue distinguished based on the attribute information.

12. The method of claim 9, wherein:
the switching device further includes a reception queue configured to store the received frame; and
the determining includes determining whether a frame extracted from the reception queue is the first frame or the second frame based on header information of the frame.

13. The method of claim 9, wherein:
the destination determination information stored in the first database is not updated upon receipt of the first frame; and
the destination determination information stored in the second database is updated upon receipt of the second frame.

14. A non-transitory computer-readable storage medium having stored thereon a program executed by a computer of a switching device including a plurality of communication ports, the program comprising instructions capable of causing the computer to execute functions of:
receiving a frame from a first external communication device connected to a first communication port of the communication ports; and
determining a second communication port to which a second external communication device serving as a destination of the received frame is connected, by accessing destination determination information stored in a first database based on header information added to a first frame which is to be forwarded with low delay when the received frame is the first frame, and determining the second communication port by accessing destination determination information stored in a second database based on header information added to a second frame which differs from the first frame when the received frame is the second frame,
wherein:
the first database is accessible to the destination determination information at a higher speed than the second database;
the determining comprises caching first destination determination information stored in the first database and second destination determination information stored in the second database, and determining the second communication port based on the cached first and second destination determination information;
the first destination determination information stored in the first database and the cached first destination determination information are not synchronized with each other upon receipt of the first frame; and
the second destination determination information stored in the second database and the cached second destination determination information are synchronized with each other upon receipt of the second frame.

* * * * *